(12) United States Patent
de Wolf et al.

(10) Patent No.: US 10,294,412 B2
(45) Date of Patent: *May 21, 2019

(54) ENVIRONMENTALLY FRIENDLY STIMULATION FLUIDS, PROCESSES TO CREATE WORMHOLES IN CARBONATE RESERVOIRS, AND PROCESSES TO REMOVE WELLBORE DAMAGE IN CARBONATE RESERVOIRS

(71) Applicant: AKZO NOBEL CHEMICALS INTERNATIONAL B.V., Amersfoort (NL)

(72) Inventors: Cornelia Adriana de Wolf, Eerbeek (NL); Hisham Nasr-El-Din, College Station, TX (US); James N. LePage, Chicago, IL (US); Mohamed Ahmed Nasr-El-Din Mahmoud, Dhahran (SA); Johanna Hendrika Bemelaar, Deventer (NL)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 476 days.

This patent is subject to a terminal disclaimer.

(21) Appl. No.: 14/832,042

(22) Filed: Aug. 21, 2015

(65) Prior Publication Data

US 2015/0361330 A1 Dec. 17, 2015

Related U.S. Application Data

(63) Continuation of application No. 13/326,561, filed on Dec. 15, 2011, now Pat. No. 9,150,780.

(Continued)

(51) Int. Cl.
*C09K 8/60* (2006.01)
*C09K 8/74* (2006.01)

(Continued)

(52) U.S. Cl.
CPC ............. *C09K 8/74* (2013.01); *C09K 8/60* (2013.01); *C09K 8/602* (2013.01); *C09K 8/84* (2013.01); *C09K 8/86* (2013.01)

(58) Field of Classification Search
CPC . C09K 8/60; C09K 8/602; C09K 8/84; C09K 8/86; Y10S 507/933

(Continued)

(56) References Cited

U.S. PATENT DOCUMENTS

| | | | |
|---|---|---|---|
| 3,768,564 A * | 10/1973 | Knox ............... | C09K 8/72 166/307 |
| 5,783,524 A | 7/1998 | Greindl et al. | |

(Continued)

FOREIGN PATENT DOCUMENTS

| | | |
|---|---|---|
| EP | 1004571 B1 | 9/2004 |
| JP | H11-012596 A | 1/1999 |

(Continued)

OTHER PUBLICATIONS

Australian Office Action dated Jul. 4, 2014 for related Application No. 2011200525.

(Continued)

*Primary Examiner* — Aiqun Li
(74) *Attorney, Agent, or Firm* — Sandra B. Weiss

(57) ABSTRACT

The present invention includes processes to create wormholes in carbonate reservoirs by contacting a formation with a solution comprising glutamic acid N,N-diacetic acid (GLDA) and/or a salt thereof, methylglycine-N,N-diacetic acid (MGDA) and/or a salt thereof, or a combination thereof. The present invention also includes processes to remove wellbore damage in a carbonate reservoir by contacting a damaged zone of the carbonate reservoir with a solution comprising GLDA and/or a salt thereof, methylglycine-N,N-diacetic acid (MGDA) and/or a salt thereof, or a (Continued)

Dissolution of calcite using 20 wt% GLDA at different initial pH values at 180 °F.

combination thereof. The present invention further includes solutions comprising a salt and further comprising GLDA and/or a salt thereof, methylglycine-N,N-diacetic acid (MGDA) and/or a salt thereof, or a combination thereof.

6 Claims, 67 Drawing Sheets

Related U.S. Application Data

(60) Provisional application No. 61/424,253, filed on Dec. 17, 2010.

(51) Int. Cl.
*C09K 8/84* (2006.01)
*C09K 8/86* (2006.01)

(58) Field of Classification Search
USPC .............................. 507/241, 933; 166/305.1
See application file for complete search history.

(56) References Cited

U.S. PATENT DOCUMENTS

| | | |
|---|---|---|
| 2007/0281868 A1 | 12/2007 | Pauls et al. |
| 2008/0035340 A1* | 2/2008 | Welton ............... C09K 8/035 166/279 |
| 2008/0108539 A1 | 5/2008 | Kany et al. |
| 2008/0153718 A1 | 6/2008 | Heidenfelder et al. |
| 2008/0277112 A1 | 11/2008 | Welton et al. |
| 2008/0300159 A1 | 12/2008 | Seebeck et al. |
| 2009/0246671 A1 | 10/2009 | Suzuki |
| 2010/0276152 A1 | 11/2010 | De Wolf et al. |
| 2013/0000902 A1* | 1/2013 | Welton ............... C09K 8/528 166/280.2 |

FOREIGN PATENT DOCUMENTS

| | | |
|---|---|---|
| JP | H11-158498 A | 6/1999 |
| JP | 2000-234286 A | 8/2000 |
| JP | 2008-174724 A | 7/2008 |
| JP | 2009-515022 A | 4/2009 |
| JP | 2009-522420 A | 6/2009 |
| JP | 2010-082600 A | 4/2010 |
| RU | 2 100 587 C1 | 12/1997 |
| RU | 2 272 900 C1 | 3/2006 |
| RU | 2 387 692 C1 | 4/2010 |
| WO | 2005/028592 A1 | 3/2005 |
| WO | 2006/041822 A2 | 4/2006 |
| WO | 2006/054261 A3 | 5/2006 |
| WO | 2007/026528 A1 | 3/2007 |
| WO | 2007/052004 A1 | 5/2007 |
| WO | 2007/104054 A1 | 9/2007 |
| WO | 2008/015464 A1 | 2/2008 |
| WO | WO 2008/065109 A1 | 6/2008 |
| WO | WO 2008/089262 A1 | 7/2008 |
| WO | 2008/139164 A1 | 11/2008 |
| WO | WO 2009/024518 A1 | 2/2009 |
| WO | WO 2009/024519 A1 | 2/2009 |
| WO | 2009/091652 A2 | 7/2009 |
| WO | WO 2009/086954 A1 | 7/2009 |
| WO | WO 2009/137399 A2 | 11/2009 |
| WO | 2010/053904 A2 | 5/2010 |
| WO | WO 2011/076769 | 6/2011 |

OTHER PUBLICATIONS

SPE 31074—Fredd et al., "Alternative Stimulation Fluids and Their Impact on Carbonate Acidizing," Mar. 1998 SPE Journal.
SPE 63242—Frenier et al., "Use of Highly Acid-Soluble Chelating Agents in Well Stimulation Services," Oct. 2000 SPE Journal.
SPE 121709—Lepage et al., "An Environmentally Friendly Stimulation Fluid for High-Temperature Applications," Feb. 2010 SPE Journal.
SPE 127923—Mahmoud et al., "Evaluation of a New Environmentally Friendly Chelating Agent for High-Temperature Applications," Feb. 2010 SPE Journal.
SPE 131626—Mahmoud et al., "An Effective Stimulation Fluid for Deep Carbonate Reservoirs: A Core Flood Study," Jun. 2010 SPE Journal.
SPE 132286—Mahmoud et al., "Stimulation of Carbonate Reservoirs Using GLDA (Chelating Agent) Solutions," Jun. 2010 SPE Journal.
SPE 133497—Mahmoud et al., "Optimum Injection Rate of a New Chelate That Can Be Used to Stimulate Carbonate Reservoirs," 2010 SPE Journal.
Options for High-Temperature Well Stimulation, Salah Al-Harthy et al, Oilfield Review Wrinter 2008/2009, 20, No. 4, pp. 52-62.
SPE107636, "Investigation of a Single-Stage Sandstone Acidizing fluid for High-Temperature Formations", H.A. Nasr-El-Din et al., May 30-Jun. 1, 2007, Society of Petroleum Engineers, pp. 1-12.
SPE127923, "Evaluation of a New Environmentally Friendly Chelating Agent for High-Temperature Applications", M.A. Mahmoud et al., Feb. 10-12, 2010, Society of Petroleum Engineers, pp. 1-16.
SPE131626, "An Effective Stimulation Fluid for Deep Carbonate Reservoirs: A Core Flood Study", M.A. Mahmoud et al., Jun. 8-10, 2010, Society of Petroleum Engineers, pp. 1-15.
SPE132286, "Stimulation of Carbonate Reservoirs Using GLDA (Chelating Agent) Solutions", M.A. Mahmoud et al., Jun. 27-30, 2010, Society of Petroleum Engineers, pp. 1-14.
SPE133497, "Optimum Injection Rate of a New ChelateThat Can be used to Stimulate Carbonate Reservoirs", M.A. Mahmoud et al., Sep. 20-22, 2010, Society of Petroleum Engineers, pp. 1-22.
SPE121709, "An Environmentally Friendly Stimulation Fluid for High-Temperature Applications", J.N. LePage et al., Apr. 20-22, 2010, Society of Petroleum Engineers, SPE Journal, pp. 1-7.

\* cited by examiner

Dissolution of calcite using 20 wt% GLDA at different initial pH values at 180 °F.

Concentration of complexed calcium as a reaction of initial pH and time at 180 °F.

Effect of initial pH on the chelating ability of 20 wt% GLDA at 180 °F.

| Initial pH | Final pH | Total Calcium Concentration, ppm | Chelated Calcium Concentration, ppm | Ratio between Chelated and Maximum Calcium Concentration |
|---|---|---|---|---|
| 1.7 | 2.5 | 23600 | 4000 | 0.36 |
| 3.0 | 4.3 | 19730 | 4630 | 0.41 |
| 8.0 | 6.5 | 15200 | 9000 | 0.80 |
| 13 | 12.8 | 11200 | 11200 | 1.00 |

Effect of pH on the chelation of GLDA at 180 °F.

Effect of 5 wt% NaCl on 20 wt% GLDA reaction with calcite at 180 °F.

Effect of 5 wt% $CaCl_2$ on GLDA reaction with calcite at 180 °F. Net calcium concentration = total dissolved calcium −calcium from 5 wt% $CaCl_2$ Comparison between GLDA (pH = 13), HEDTA (pH = 11) and EDG (pH = 11) at 180 °F.

Thermal stability of different GLDA solutions (0.6M) at 350 °F after 6 hrs.

Data for core flood tests.

|  | Test#1 | Test#2 |
|---|---|---|
| Flow rate, cm$^3$/min | 2 | 3 |
| Temperature, °F | 200 | 220 |
| Core length, in. | 20 | 20 |
| Core diameter, in. | 1.5 | 1.5 |
| Initial core permeability, md | 6.1 | 10.2 |
| Porosity, vol% | 19.7 | 20 |
| Confining pressure, psi | 2200 | 2200 |
| Back pressure, psi | 1100 | 1100 |
| Core pore volume, cm$^3$ | 108 | 109.3 |
| Injected chelate concentration, wt% | 20 | 20 |
| pH of chelate solution | 1.7 | 1.7 |
| Core permeability after the test, md | 130 | 275 |

FIG. 8

Pressure drop across the core at 2 cm³/min & 200 °F for 20 wt% GLDA with pH = 1.7.

Pressure drop across the core at 3 cm$^3$/min, 220 °F for 20 wt% GLDA with pH = 1.7.

Density and viscosity measurements of 20 wt% GLDA (pH = 1.7) solutions with different calcium concentrations at room temperature.

| Calcium Concentration, ppm | Density, g/cm$^3$ | Viscosity, cp |
|---|---|---|
| 0 | 1.13 | 2.52 |
| 10,000 | 1.15 | 2.80 |
| 20,000 | 1.17 | 3.23 |
| 30,000 | 1.18 | 3.57 |
| 40,000 | 1.20 | 3.80 |
| 50,000 | 1.22 | 4.20 |

FIG. 11

Total calcium concentration & GLDA concentration in the core effluent samples at flow rate of 2 cm$^3$/min & 200 °F for 20 wt% GLDA with pH = 1.7.

Total calcium concentration & GLDA concentration in the core effluent samples at flow rate of 3 cm$^3$/min & 220 °F for 20 wt% GLDA with pH = 1.7.

(a)

(b)

A cross-sectional area for each slice along the core length after treatment for: (a) 2 cm$^3$/min & 200 °F; (b) 3 cm$^3$/min & 220 °F.

3D CT scan after the core flood test for: (a) 2 cm³/min & 200°F; (b) 3 cm³/min & 220°F.

Data for 6 in. core flood experiments.

| Exp.# | Initial pH GLDA Solution | Core porosity, vol % | Initial core permeability ($K_{initial}$), md | Final core permeability ($K_{final}$), md | $K_{final}/K_{initial}$ | Flow rate, cm³/min | Pore volume to breakthrough, PV | Dissolved calcium, g | Temperature, °F |
|---|---|---|---|---|---|---|---|---|---|
| 1 | 1.7 | 13.5 | 2.00 | 350 | 175 | 2 | 3.65 | 5.93 | 180 |
| 2 | 1.7 | 10.5 | 0.65 | 180 | 277 | 2 | 2.30 | 6.84 | 250 |
| 3 | 1.7 | 11.3 | 0.55 | 250 | 450 | 2 | 1.65 | 7.25 | 300 |
| 4 | 3.0 | 15.8 | 1.00 | 120 | 120 | 2 | 3.80 | 5.85 | 180 |
| 5 | 3.0 | 14.1 | 2.73 | 400 | 147 | 2 | 2.65 | 6.45 | 250 |
| 6 | 3.0 | 13.5 | 1.25 | 310 | 250 | 2 | 2.00 | 6.74 | 300 |
| 7 | 13 | 10.3 | 0.35 | 11.6 | 33 | 2 | 18.0 | 2.51 | 180 |
| 8 | 13 | 12.1 | 0.66 | 31.7 | 48 | 2 | 14.0 | 3.21 | 250 |
| 9 | 13 | 12.4 | 1.45 | 85 | 59 | 2 | 8.50 | 3.53 | 300 |

FIG. 16

Pressure drop across the core at a flow rate of 2 cm³/min & 180 °F for 20 wt% GLDA with pH = 1.7.

Density and viscosity measurements of 20 wt% GLDA (pH = 1.7, 3, and 13) solutions with different calcium concentrations at room temperature.

| Calcium concentration, ppm | pH = 1.7 | | pH = 3 | | pH = 13 | |
|---|---|---|---|---|---|---|
| | Density, g/cm$^3$ | Viscosity, cP | Density, g/cm$^3$ | Viscosity, cP | Density, g/cm$^3$ | Viscosity, cP |
| 0 | 1.132 | 2.52 | 1.125 | 3.20 | 1.126 | 2.11 |
| 5000 | — | — | 1.133 | 3.87 | 1.134 | 2.64 |
| 10,000 | 1.151 | 2.80 | 1.143 | 4.65 | 1.142 | 3.18 |
| 15,000 | — | — | — | — | 1.150 | 3.73 |
| 20,000 | 1.173 | 3.23 | 1.160 | 5.56 | — | — |
| 30,000 | 1.182 | 3.57 | 1.168 | 6.49 | — | — |
| 40,000 | 1.202 | 3.80 | — | — | — | — |
| 50,000 | 1.223 | 4.20 | — | — | — | — |

FIG. 18

Total and complexed calcium concentration & GLDA concentration in the core effluent samples at a flow rate of 2 cm$^3$/min & 180 °F for 20 wt% GLDA with pH = 1.7.

Core effluent samples pH and density at a flow rate of 2 cm³/min & 180 °F for 20 wt% GLDA with pH = 1.7.

Pressure drop across the core at a flow rate of 2 cm³/min & 180 °F for 20 wt% GLDA with pH = 3.

Total and complexed calcium concentration & GLDA concentration in the core effluent samples at a flow rate of 2 cm³/min & 180 °F for 20 wt% GLDA with pH = 1.7.

Core effluent samples pH and density at a flow rate of 2 cm$^3$/min & 180°F for 20 wt% GLDA with pH = 3.

Pressure drop across the core at a flow rate of 2 cm³/min & 180 °F for 20 wt% GLDA with pH = 13.

Total calcium and GLDA concentrations in the core effluent samples at a flow rate of 2 cm³/min & 180 °F for 20 wt% GLDA with pH = 13.

Core effluent samples pH and density at a flow rate of 2 cm$^3$/min & 180 °F for 20 wt% GLDA with pH = 13.

Effect of 20 wt% GLDA solution pH on the pore volume to breakthrough the core at a flow rate of 2 cm³/min at 180, 250, and 300 °F.

Effect of 20 wt% GLDA solution pH on the ratio between final and initial permeability of the core at a flow rate of 2 cm³/min at 180, 250, and 300 °F.

Effect of 20 wt% GLDA solution pH on the amount of calcium dissolved from the core at a flow rate of 2 cm³/min at 180, 250, and 300 °F.

Inlet and outlet core faces after the core flood experiments with 20 wt% GLDA at 2 cm³/min at 300 °F for (a) pH = 1.7, (b) pH = 3, and (c) pH = 13.

Total calcium and magnesium concentrations in the core flood effluent samples at 180 °F and 5 cm$^3$/min, 20 wt% GLDA (pH = 1.7).

Core flood data for 20 in. long calcite cores.

|  | Exp.#1 | Exp.#2 | Exp.#3 |
|---|---|---|---|
| Flow rate, cm$^3$/min | 1 | 2 | 3 |
| Initial pH GLDA solution | 3 | 1.7 | 1.7 |
| Temperature, °F | 250 | 200 | 200 |
| Initial core permeability, md | 0.8 | 6.1 | 10.2 |
| Porosity, vol % | 16.7 | 19.7 | 20.0 |
| Final core permeability, md | 250 | 130 | 270 |
| $K_{final}/K_{initial}$ | 312 | 21 | 27 |
| Pore volume to breakthrough, $PV_{bt}$ | 2.0 | 2.1 | 2.65 |

FIG. 32

3D CT scan after the core flood test for: (a) 1 cm³/min, pH = 3 & 250 °F; (b) 2 cm³/min, pH = 1.7 & 200 °F and (c) 3 cm³/min, pH = 1.7 & 200 °F.

Core flood data for Pink Desert cores, 20 wt% GLDA of pH = 1.7 at 180 °F.

| Exp.# | $K_{initial}$, md | $K_{final}$, md | $K_f/K_i$ | q, cm$^3$/min | $\phi$, fraction | $PV_{bt}$ | Ca, gm |
|---|---|---|---|---|---|---|---|
| 1 | 120 | 1000 | 8.33 | 0.75 | 0.20 | 4.35 | 8.20 |
| 2 | 100 | 1500 | 15.0 | 1.00 | 0.23 | 4.25 | 7.53 |
| 3 | 50 | 990 | 19.8 | 2.00 | 0.20 | 3.95 | 6.65 |
| 4 | 36 | 820 | 23.1 | 3.00 | 0.19 | 3.75 | 6.23 |
| 5 | 50 | 890 | 17.8 | 5.00 | 0.22 | 5.00 | 5.74 |
| 6 | 50 | 655 | 13.1 | 6.00 | 0.22 | 5.55 | 5.23 |
| 7 | 55 | 570 | 10.4 | 7.50 | 0.20 | 6.20 | 5.1 |
| 8 | 56 | 430 | 7.68 | 10.0 | 0.21 | 8.00 | 4.85 |

FIG. 34

Pore volumes to breakthrough with 20 wt% GLDA at pH 1.7 and 180 °F for Pink Desert cores.

Permeability ratio as a function of flow rate with 20 wt% GLDA at pH 1.7 and 180 °F for Pink Desert cores.

Total dissolved calcium with 20 wt% GLDA at pH 1.7 and 180 °F for Pink Desert cores.

Core flood data for Indiana limestone cores, 20 wt% GLDA of pH = 1.7 at 180 °F.

| Exp.# | $K_{initial}$, md | $K_{final}$, md | $K_f/K_i$ | q, cm$^3$/min | $\phi$, fraction | $PV_{bt}$ | Ca, gm |
|---|---|---|---|---|---|---|---|
| 1 | 2.0 | 300 | 150 | 0.50 | 0.14 | 3.15 | 6.35 |
| 2 | 1.8 | 280 | 156 | 0.75 | 0.15 | 2.95 | 6.25 |
| 3 | 1.0 | 250 | 250 | 1.00 | 0.15 | 2.85 | 6.05 |
| 4 | 2.0 | 350 | 175 | 2.00 | 0.14 | 3.00 | 5.95 |
| 5 | 5.5 | 450 | 82 | 3.00 | 0.13 | 3.20 | 5.23 |
| 6 | 5.2 | 300 | 58 | 5.00 | 0.15 | 4.50 | 5.15 |
| 7 | 3.7 | 200 | 54 | 7.50 | 0.10 | 6.50 | 4.10 |

FIG. 38

Core flood data for Indiana limestone cores, 20 wt% GLDA of pH = 3 at 180 °F.

| Exp.# | $K_{initial}$, md | $K_{final}$, md | $K_f/K_i$ | q, cm$^3$/min | φ, fraction | $PV_{bt}$ | Ca, gm |
|---|---|---|---|---|---|---|---|
| 1 | 0.65 | 260 | 400 | 0.50 | 0.12 | 3.26 | 5.45 |
| 2 | 0.50 | 420 | 840 | 1.00 | 0.12 | 3.11 | 5.25 |
| 3 | 2.73 | 480 | 176 | 2.00 | 0.14 | 3.35 | 4.85 |
| 4 | 3.45 | 507 | 147 | 3.00 | 0.14 | 5 | 4.56 |
| 5 | 4.70 | 611 | 130 | 4.00 | 0.15 | 6.27 | 4.25 |
| 6 | 1.00 | 95 | 95 | 5.00 | 0.13 | 7 | 3.54 |
| 7 | 2.75 | 239 | 87 | 6.00 | 0.14 | 7.65 | 2.95 |

FIG. 39

Effect of flow rate on the pore volumes to breakthrough with 20 wt% GLDA at pH 1.7 and 180 °F for Indiana limestone cores.

Permeability ratio with 20 wt% GLDA at pH 1.7 and 180 °F for Indiana limestone cores.

Total dissolved calcium with 20 wt% GLDA at pH 1.7 and 180 °F Indiana limestone cores.

Effect of flow rate on the pore volumes to breakthrough with 20 wt% GLDA at pH 3 and 180 °F for Indiana limestone cores.

Permeability ratio with 20 wt% GLDA at pH 3 and 180 °F for Indiana limestone cores.

Total dissolved calcium with 20 wt% GLDA at pH 3 and 180 °F Indiana limestone cores.

Pore volumes to breakthrough for Indiana limestone cores with 20 wt% GLDA at pH 3 and pH 1.7 at 180 °F.

Core flood data for the effect of GLDA concentration at different pH values.

| GLDA solution concentration, wt% | Temperature, °F | Flow rate, cm³/min | Initial pH of GLDA solution | | | |
|---|---|---|---|---|---|---|
| | | | 1.7 | | 3 | |
| | | | Maximum $Ca^{2+}$, ppm | $PV_{bt}$ | Maximum $Ca^{2+}$, ppm | $PV_{bt}$ |
| 10 | 250 | 2 | 32000 | 5.85 | 18000 | 7.35 |
| 15 | 250 | 2 | 35000 | 3.10 | 25000 | 3.55 |
| 20 | 250 | 2 | 45000 | 2.30 | 32000 | 2.65 |
| 30 | 250 | 2 | 24000 | 4.50 | 28000 | 4.00 |

FIG. 47

Effect of GLDA concentration on the volume of 20 wt% GLDA solutions required to form wormholes at a flow rate of 2 cm³/min and 250 °F.

Effect of GLDA concentration on the amount of calcium dissolved in the core flood effluent at a flow rate of 2 cm³/min and 250 °F.

Effect of Temperature on the optimum injection rate of 3.4 wt% HCl.

Effect of Temperature on the optimum injection rate of 20 wt% GLDA solution at pH 3.

3D Images for the wormholes formed by (a) 20 wt% GLDA at pH 1.7, 2 cm$^3$/min and 200 °F, and (b) 15 wt% HCl at 2 cm$^3$/min and 72 °F.

Pore volume to breakthrough with 20 wt% GLDA solutions at pH 1.7 at 180, 250, and 300 °F using Indiana limestone cores.

Pore volumes to breakthrough with 20 wt% GLDA solutions, pH 3 at 180, 250, and 300 °F using Indiana limestone cores.

Pore volumes to breakthrough with 20 wt% GLDA solutions, pH 1.7 at 180, 250, and 300 °F using Pink Desert limestone cores.

Pore volume to breakthrough with 20 wt% GLDA solutions, pH 3 at 250 °F for 20-in. and 6-in. Indiana limestone cores.

3D CT scans for 6-in. Pink Desert cores at 180 °F using 20 wt% GLDA at pH =1.7.

3D CT scan after the coreflood experiments for 20-in. Indiana limestone cores at 200 °F using 20 wt% GLDA at pH =1.7.

Dependence of the number of pore volumes to breakthrough on the Damköhler number for pink desert cores, 20 wt% GLDA of pH = 1.7 at 180 °F.

Pore volume to breakthrough as a function of injection rate at 250 °F.

Difference in wormhole pattern between HCl and GLDA at 1 cm³/min and 200 °F.

Effect of temperature on the wormhole size. Bigger wormholes were created at high temperature due to the higher reaction rate.

Effect of flow rate on the wormhole size. At low rate bigger wormholes were created due to the increased contact time allowed more calcium to be dissolved.

Effect of initial permeability on the wormhole size. High permeability allowed more time for reaction and created bigger wormholes.

Effect of 20 wt% GLDA solution initial pH on the wormhole size.

Effect of NaCl concentration on GLDA (20 wt%, pH =3) performance during coreflood experiments at 2 cm³/min and 300 °F.

Effect of NaCl concentration on the wormhole shape and size. Coreflood experiments were run using 20 wt% GLDA at pH 3.8, 2 cm$^3$/min, and 300 °F using 6-in. cores.

ENVIRONMENTALLY FRIENDLY STIMULATION FLUIDS, PROCESSES TO CREATE WORMHOLES IN CARBONATE RESERVOIRS, AND PROCESSES TO REMOVE WELLBORE DAMAGE IN CARBONATE RESERVOIRS

CROSS-REFERENCE TO RELATED APPLICATIONS

This application is a continuation of U.S. patent application Ser. No. 13/326,561, filed on Dec. 15, 2011, which claims priority to U.S. Provisional Patent Application No. 61/424,253, filed on Dec. 17, 2010, the contents of which are each incorporated herein by reference in their entirety.

BACKGROUND OF THE INVENTION

Matrix acidizing in carbonate formations is used to improve the production from a well by creating wormholes. The flow and reaction of hydrochloric acid (HCl) in carbonate porous media results in the formation of highly conductive flow channels or wormholes. Wormholes form because of the natural heterogeneity of the porous matrix and the rapid, mass transfer limited, and almost complete dissolution of the mineral in the acid. The acid preferentially flows to the regions of the highest permeability. These initial flow paths are enlarged by rapid dissolution of the matrix material, causing these regions to receive even more of the flow. A dominant channel quickly forms and continues to propagate while diverting flow from other regions. Once formed, the wormhole channels provide negligible resistance to flow and carry essentially all the injection fluid. HCl has also been used as an acidizing treatment to remove near-wellbore damage.

HCl treatment often requires a low injection rate to prevent fracturing the formation rock. In addition, the injection of HCl into carbonate formations at low injection rates results in face dissolution or complete dissolution of the carbonate matrix near the wellbore and causes corrosion. This face dissolution consumes large volumes of acid and provides negligible increases in the conductivity of the formation.

Ethylenediaminetetraaceticacid (EDTA) has been used to stimulate carbonate porous media and remove calcium carbonate scale from underground formations. EDTA is a chelating agent that stimulates by means of sequestering the metal components of the carbonate matrix. The dissolution mechanism is different than that of HCl in that hydrogen ions are not required.

In oilfield chemical treatments, chelating agents are frequently added to stimulation acids to prevent precipitation of solids as the acid spends on the formation are being treated. These precipitates include iron hydroxide and iron sulfide. In addition, chelating agents are used as components in many scale removal/prevention formulations. Chelating formulations based on EDTA, nitriloacetic acid (NTA) and diethylenetriaminepentaacetic acid (DTPA) have been used to control iron precipitation and to remove scale. However, EDTA has low solubility in HCl and is not readily biodegradable. NTA is somewhat better in acid solubility and biodegradability, but has a lower stability constant for iron than EDTA and DTPA and is considered to be an animal carcinogen.

SUMMARY OF THE INVENTION

The present invention includes processes to create wormholes in carbonate reservoirs by contacting a formation with a solution comprising glutamic acid N,N-diacetic acid (GLDA) and/or a salt thereof, methylglycine-N,N-diacetic acid (MGDA) and/or a salt thereof, or a combination thereof. In some embodiments of the invention, the solution is an aqueous solution that comprises GLDA, MGDA or a combination thereof in an amount of about 10 to about 30 wt %, or alternatively about 20 wt %. The solution may include a salt, such as without limitation a chloride salt, a bromide salt, a formate salt or a combination thereof, such as without limitation sodium chloride (NaCl), potassium chloride (KCl), calcium chloride ($CaCl_2$), magnesium chloride ($MgCl_2$), ammonium chloride ($NH_4Cl$), sodium bromide (NaBr), potassium bromide (KBr), sodium formate (HCOONa), potassium formate (HCOOK), cesium formate (HCOOCs) or a combination thereof, in an amount, for non limiting example, from about 0 to about 20 wt % of the solution, with the understanding that the salt might precipitate at higher concentrations. In some embodiments of the processes to create wormholes, the formations are contacted with a solution having a pH of about 1 to about 14, of about 3 to about 5, or about 3.8. The downhole temperature of the carbonate reservoir may be from about 35 to about 400° F., or from about 180 to about 300° F., and the injection rate may be from about 0.25 to about 5 barrels/min, or from about 0.5 to about 1.5 barrels/min. Temperatures toward the upper end of this range tend to increase the reaction rate and provide the ability to use a lower amount of GLDA and/or MGDA to breakthrough the core and form a wormhole. Unlike HCl and EDTA, GLDA and/or MGDA have less or no face dissolution or washout in the cores at very low injection rates. GLDA and/or MGDA used at a low pH create wormholes with a small number of pore volumes.

The present invention also includes processes to remove wellbore damage in a carbonate reservoir by contacting a damaged zone of the carbonate reservoir with a solution comprising GLDA and/or a salt thereof, methylglycine-N,N-diacetic acid (MGDA) and/or a salt thereof, or a combination thereof. The solution may include the features described above.

The present invention further includes solutions comprising a salt in addition to GLDA and/or a salt thereof, methylglycine-N,N-diacetic acid (MGDA) and/or a salt thereof, or a combination thereof. The salt may comprise without limitation a chloride salt, a bromide salt, a formate salt or a combination thereof, such as without limitation, NaCl, KCl, $CaCl_2$, $MgCl_2$, $NH_4Cl$, NaBr, KBr, HCOONa, HCOOK, HCOOCs, or a combination thereof. The solution may include the features described above. The presence of the salt, with a possible exception for the calcium salts, does not affect GLDA and/or MGDA performance at a pH of about 13, but significantly accelerates the dissolution at a pH below about 6 (in this pH region acidic dissolution is still the major driving force).

BRIEF DESCRIPTION OF THE DRAWINGS

FIG. 8 gives the data for the two core flood tests.

FIG. 11 reports the viscosity and density measurements of GLDA (pH 1.7) with different concentrations of calcium at room temperature.

FIG. 16 gives the data for 6 in. long cores for different pH levels of 20 wt % GLDA solutions.

FIG. 18 shows the viscosity and density measurements of GLDA (pH=1.7) with different concentrations of calcium at room temperature.

FIG. 32 gives the data for three core flood experiments using 20 in. long cores.

FIG. 34 gives the data for the core flood experiments that were run on the Pink Desert cores by 20 wt % GLDA of pH 1.7 at 180° F.

FIGS. 38 and 39 give the data for the core flood experiments that were run at 180° F.

FIG. 47 lists the outcome of the core flood experiments performed to study the effect of GLDA concentration on the volume of GLDA required to form wormholes.

DETAILED DESCRIPTION OF THE INVENTION

Figure 1:
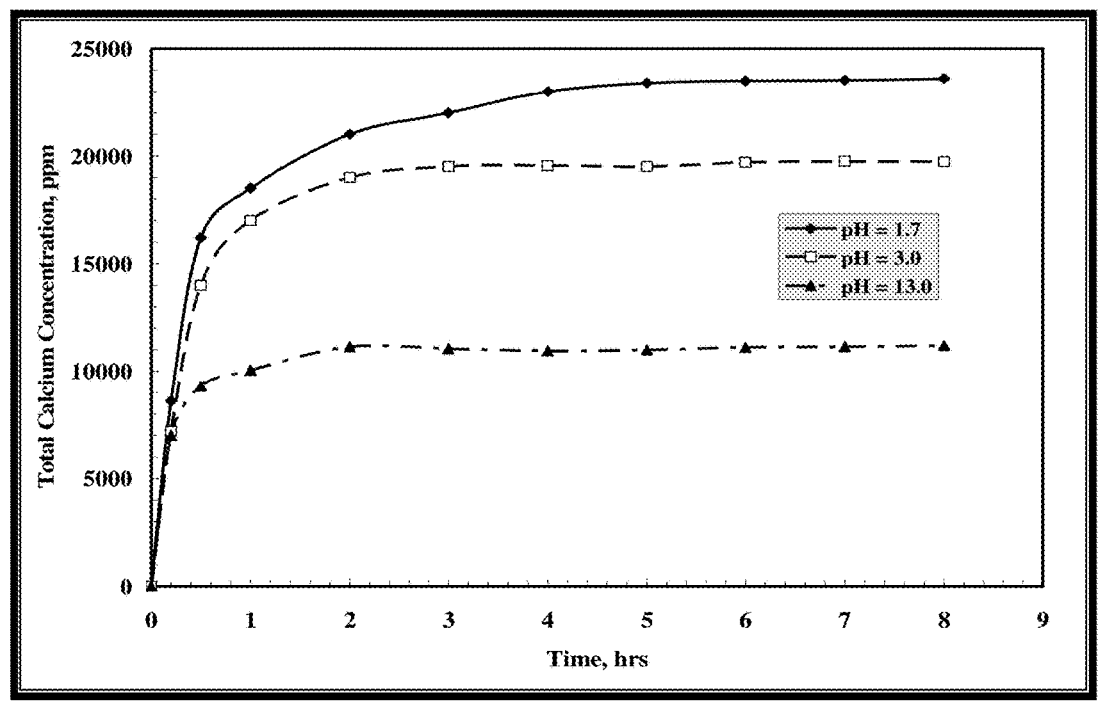
FIG. 1 shows the effect of the initial pH value on the calcium concentration for the samples collected during the reaction of GLDA with calcite.

Carbonate matrix acidizing using hydrochloric acid-based stimulation fluids has been used in various concentrations. At high temperatures, HCl does not produce acceptable stimulation results because of its fast reaction in the near wellbore area, low acid penetration, and surface dissolution. Increasing the flow rate is no option in many cases as this increases the risk of fracturing the formation. In addition, HCl is very corrosive to the well tubulars, particularly at elevated temperatures and for chromium-based tubulars.

Alternative stimulations fluids based on organic acids, such as acetic or formic acids suffer from having low solubility of formed calcium salts and cannot be used at high acid concentrations. Such alternative stimulation fluids may also have corrosion and thermal stability problems at high temperatures.

Chelating agents, such as EDTA and 2-hydroxyethylethylenediaminetriacetic acid (HEDTA), have been applied for stimulation applications, but they biodegrade too slowly and are less effective than the stimulation fluids of the present invention.

In contrast, GLDA and/or MGDA are unexpectedly effective in forming wormholes in calcium carbonate compared to other chelates and acids. Due to their high solubility in the acidic form, GLDA and/or MGDA can dissolve approximately twice as much calcium carbonate in comparison to the conventional chelates, like EDTA and HEDTA. The effects are also found at low injection rates and high temperatures, therefore with GLDA and/or MGDA there is no face dissolution and there is reduced risk of fracturing the rock.

GLDA and/or MGDA may be able to stimulate parallel calcite cores with a permeability ratio of up to 6.25 without using diverting agents. In addition, GLDA and/or MGDA are gentle to the well tubular, including tubulars based on chromium.

The present invention includes processes to create wormholes in a carbonate reservoir by contacting a formation with a solution comprising glutamic acid N,N-diacetic acid (GLDA) and/or a salt thereof, methylglycine-N,N-diacetic acid (MGDA) and/or a salt thereof, or a combination thereof. The present invention also includes processes to remove wellbore damage in a carbonate reservoir by contacting a damaged zone of the carbonate reservoir with a solution comprising GLDA and/or a salt thereof, methylglycine-N,N-diacetic acid (MGDA) and/or a salt thereof, or a combination thereof. Still further, the present invention includes solutions comprising a salt and further comprising GLDA and/or a salt thereof, methylglycine-N,N-diacetic acid (MGDA) and/or a salt thereof, or a combination thereof. For the purposes of the present application, a reference to "GLDA" alone may include a salt of GLDA as the context permits. Similarly, a reference to "MGDA" alone may include a salt of MGDA as the context permits In some embodiments of the invention, the solution is an aqueous solution comprising about 10 to about 30 wt % of GLDA and/or a salt thereof and/or MGDA and/or a salt thereof, or about 20 wt % of GLDA and/or a salt thereof and/or MGDA and/or a salt thereof. The salt of GLDA and/or MGDA may be the partially or completely neutralized potassium or sodium salt.

The solutions of the invention may further comprise a salt. Without limitation, the salt may comprise a chloride salt, a bromide salt, a formate salt or a combination thereof, such as without limitation sodium chloride (NaCl), potassium chloride (KCl), calcium chloride (CaCl$_2$), MgCl$_2$, NH$_4$Cl, NaBr, KBr, HCOONa, HCOOK, HCOOCs, or a combination thereof. The salt may be a monovalent salt. In certain embodiments, the salt is present in an amount from about 0 to about 20 wt % of the solution. The examples of the application demonstrate that the addition of 5 wt % sodium chloride does not affect the GLDA performance at pH 13, but significantly accelerated the reaction at pH 1.7. In addition, the addition of 5 wt % calcium chloride stopped the reaction of GLDA with calcite at pH 13, and GLDA chelated all the calcium in solution and did not react with calcium carbonate.

GLDA and/or MGDA have a very good ability to dissolve calcium from carbonate rock in a wide pH range of about 1 to about 14 by a combination of acid dissolution and chelation depending on pH. The calcite dissolution increases with decreasing pH as a result of the contribution of the acid dissolution process. Under more alkaline conditions, chelation becomes the dominant dissolution process. The pH of the aqueous solution may be from about 1 to about 3 in some embodiments of the invention. For non-limiting example, the pH of the solution may be from about 1 and about 14, from about 3 and about 5, or about 3.8. To adjust the pH of the solution, a GLDA and/or MGDA acid can be made from GLDA-Na4 or MGDA-Na3 by various processes known to anyone skilled in the art, such as electrodialysis, ion exchange or acidification with acids. Such processes are described, for example in commonly owned published application WO 2008/065109.

The aqueous solutions of the invention may be introduced into a carbonate formation to remove wellbore damage and/or creates wormholes in the carbonate formation. For non-limiting example, the aqueous solutions may be introduced at an injection rate of about 0.25 to about 5 barrels/min, or about 0.5 to about 1.5 barrels/min. The downhole temperature of the carbonate reservoir may be about 35 to about 400° F. or about 180 to about 300° F. High temperature applications may benefit from the presence of an oxygen scavenger in an amount less than about 2 volume percent of the solution. Some conventional stimulation fluids are corrosive at high temperatures. The examples of the present application demonstrate that GLDA at a pH of 1.7 was able to form wormholes at 2 and 3 cm$^3$/min through a 1.5 inch diameter core, and that GLDA was thermally stable at temperatures up to 350° F.

Examples 1-8 of the present application demonstrate that:
1. GLDA has a very good ability to dissolve calcium from carbonate rock in a wide pH range of about 1.7 to about 13 by a combination of acid dissolution and chelation. The calcite dissolution increases with decreasing pH as a result of the contribution of the acid dissolution process. Under more alkaline conditions, chelation becomes the dominant dissolution process;

2. The addition of 5 wt % sodium chloride does not affect the GLDA performance at pH 13, but significantly accelerated the reaction at pH 1.7;
3. The addition of 5 wt % calcium chloride stopped the reaction of GLDA with calcite at pH 13. GLDA chelated all the calcium in solution and did not react with calcium carbonate;
4. Compared to other chelating agents, GLDA dissolved more calcium than EDG but less than HEDTA at high pH values;
5. GLDA at a pH of 1.7 was able to form wormholes at 2 and 3 cm$^3$/min through a 1.5 inch diameter core; and
6. GLDA was found to be thermally stable at temperatures up to 350° F. The presence of NaCl improves the thermal stability.

Some conventional stimulation fluids are corrosive on well tubulars particularly at high temperatures and have an inability to treat heterogeneous formations without employing diversion techniques. Additionally, highly reactive conventional acids tend to preferentially flow to the higher permeable zones in heterogeneous formations. The diversion and reaction of injected acid into areas of highly permeable zones sometimes creates increased flow and reaction in these zones. This may occur at the expense of bypassing the low permeable zones leading to inefficient stimulation of the target, low permeability or damaged intervals. This may also be true for matrix acidizing of long open-hole horizontal wells and extended reach wells. The success of conventional matrix acidizing in carbonate reservoir with HCl is often limited because the optimal injection rate would exceed the fracture gradient of the formation.

Examples 9-12 of the present application demonstrate that:
1. The 20 wt % GLDA fluids of pH 1.7 and 3 were very effective in dissolving calcite and creating wormholes;
2. The higher the pH the lower the reaction rate with calcite and the more pore volumes required to create wormhole breakthrough;
3. Unlike HCl, GLDA fluids at pH 1.7 and 3 created uniform wormholes with fewer pore volumes at low rates without face dissolution or washout. This was noted up to 300° F.;
4. High temperatures increased the reaction rate of GLDA with calcite and decreased the number of pore volumes to create wormholes;
5. GLDA was effective in creating wormholes in short (6 in.) and long (20 in.) calcium carbonate cores; and
6. GLDA was very effective in stimulating dolomite cores as it chelated magnesium and calcium.

Examples 13-18 of the present application demonstrate that:
1. There was an optimum injection rate for the GLDA to create wormholes at different pH values. It was 3 cm$^3$/min for Pink Desert limestone (high permeability) and 1 cm$^3$/min for Indiana limestone (low permeability);
2. The lower the flow rate the more contact time and the better the performance of the GLDA. The 20 in. calcite cores required less pore volumes than the 6 in. cores to create wormholes at the same conditions;
3. Increasing the temperature from 180 to 250° F. did not affect the optimum injection rate at pH of 1.7 and 3. However, increasing temperature did decrease the pore volumes required to create wormholes. In contrast for HCl, increasing temperature increased not only the optimum injection rate but also the pore volumes required to create wormholes;
4. There was an optimal GLDA concentration of 20 wt % at which the minimum PV required to create wormholes; and
5. There were no face dissolution problems with GLDA at low rates compared with HCl. Compared to other chelates GLDA performed better than HEDTA.

Examples 19-25 of the present application demonstrate that:
1. There was an optimum rate for the GLDA to create wormholes at different pH values. The optimum injection rate was not affected by increasing temperature from 180 to 300° F. Increasing the core length from 6 to 20 in. decreased the optimum injection rate at the same conditions;
2. Unlike HCl, the wormhole formation in calcite cores using GLDA was found to be weakly dependent on the Damköhler number;
3. GLDA at pH 3 outperformed acetic acid and long chain carboxylic acid at high temperature; and
4. Adding 5 wt % NaCl to GLDA enhanced the performance of GLDA during the coreflood experiments. Less volume of GLDA was required in case of adding 5 wt % NaCl.

The aqueous solution of the invention may additionally contain other additives known to be suitable, such as, e.g., surfactants, builders, wetting agents, emulsifiers, bleaching agents.

Example 1—Effect of pH

GLDA/calcite slurries at a 1.5 molar ratio were put in the reaction flask at 180° F. To maintain a constant molar ratio between the calcite and GLDA, each sample was collected from a single test to keep a constant GLDA/calcite molar ratio. As shown in FIG. 1, the total calcium concentration increased with time until reaching a plateau value after 3 hours. The same behavior was noticed at all pH values. The total calcium concentration decreased as the GLDA pH value was increased. There are two reaction regimes; at low pH the acidic dissolution prevails, whereas at high pH $CaCO_3$ is removed by complexation of calcium with the chelate. The reaction rate is primarily driven by the acidic dissolution. At low pH the reaction is fast and it slows down with increasing pH.

Example 2—Effect of pH

Figure 2:
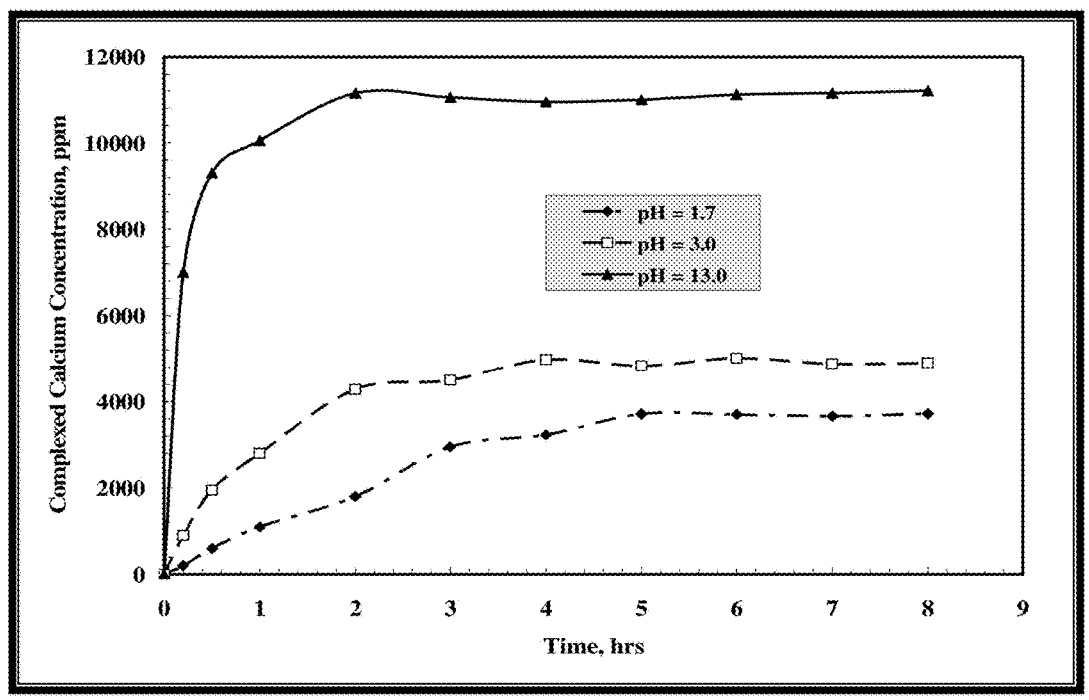
FIG. 2 shows the complexed calcium concentrations at different pH values of GLDA at 180° F.

FIG. 2 shows the complexed calcium concentrations at different pH values of GLDA at 180° F. The maximum amount of chelated calcium was noted at a pH of 13 where no free calcium remained. At high pH, the dissolution mechanism was only by the chelation reaction. As the pH decreased, the chelating ability decreased and free calcium concentration increased. At low pH, the dissolution mechanism is due to both chelation and acid dissolution (mass transfer). The highest free calcium concentration was obtained with GLDA-calcium solutions at pH=1.7.

Example 3—Effect of pH

Figure 3:
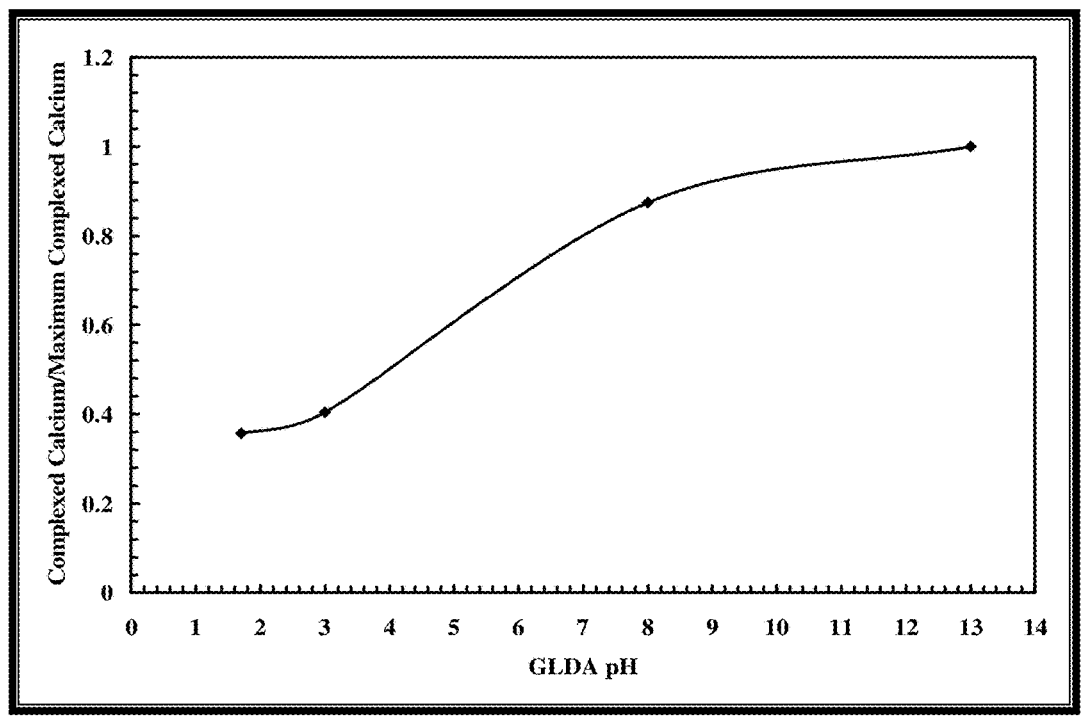
FIG. 3 shows the effect of the initial pH value on the calcite dissolution using 20 wt % GLDA solutions.

FIG. 3 shows the effect of the initial pH value on the calcite dissolution using 20 wt % GLDA solutions. There is an S-shaped relationship between the ratio of complexed/maximum complexed calcium and equilibrium pH of the GLDA solutions. The maximum complexed calcium was obtained at a pH of 13. As the pH increased, the ratio became closer to 1, meaning less free calcium exists in solution at high pH. At low pH, the ratio was very small as there was a small amount of chelated calcium compared to the total calcium concentration. At a low pH of 1.7, the GLDA exists principally in an acid form and does not chelate Ca effectively because hydrogen ions occupy the carboxylic acid groups. As the pH increased, GLDA reached a maximum chelating ability as it becomes fully deprotonated.

Example 4—Effect of Salts

Figure 4:
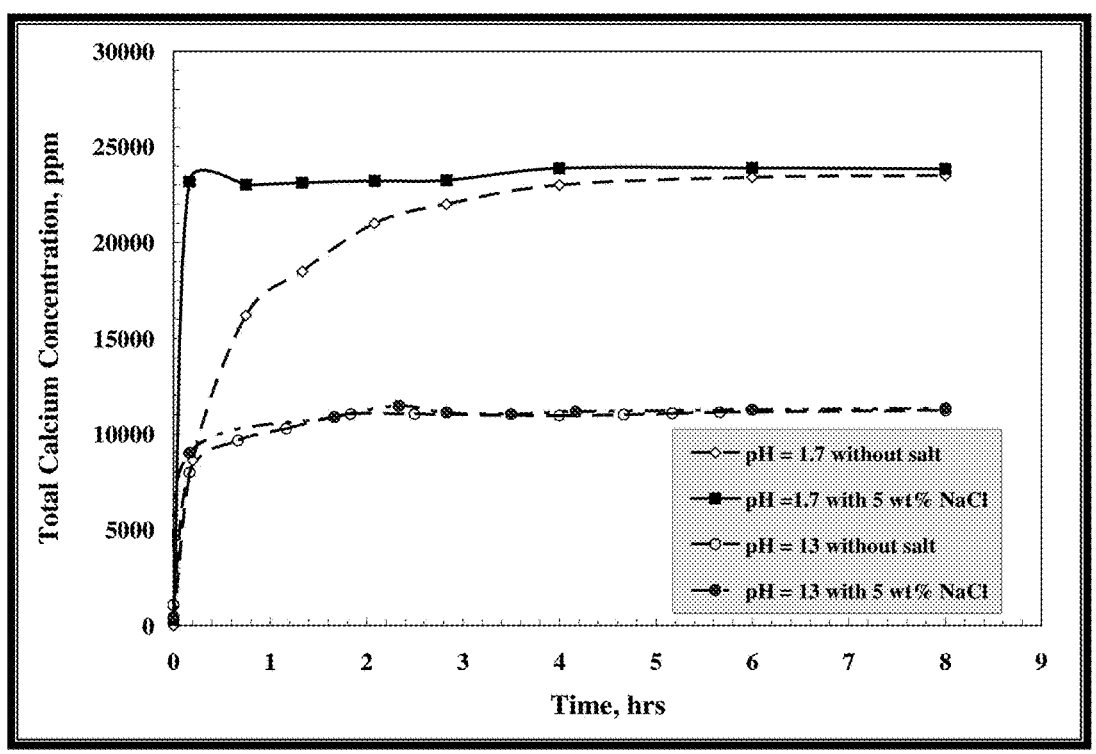
FIG. 4 shows the effect of adding 5 wt % NaCl on the dissolved calcium concentration for samples that were collected from the reactor during the reaction of GLDA at different pH with calcite at 180° F.

FIG. 4 shows the effect of adding 5 wt % NaCl on the dissolved calcium concentration for samples that were collected from the reactor during the reaction of GLDA at different pH with calcite at 180° F. The addition of 5 wt % NaCl to 20 wt % GLDA at pH 1.7 significantly accelerated the reaction as the equilibrium calcium concentration is reached after 10 minutes, whereas without NaCl it took 4 hours to reach this concentration. The calcium concentration was nearly the same in both cases. This acceleration is attributed to the increase in the ionic strength. Finally, it was found that sodium chloride does not affect the performance of GLDA of pH 13.

Example 5—Effect of Salts

Figure 5:
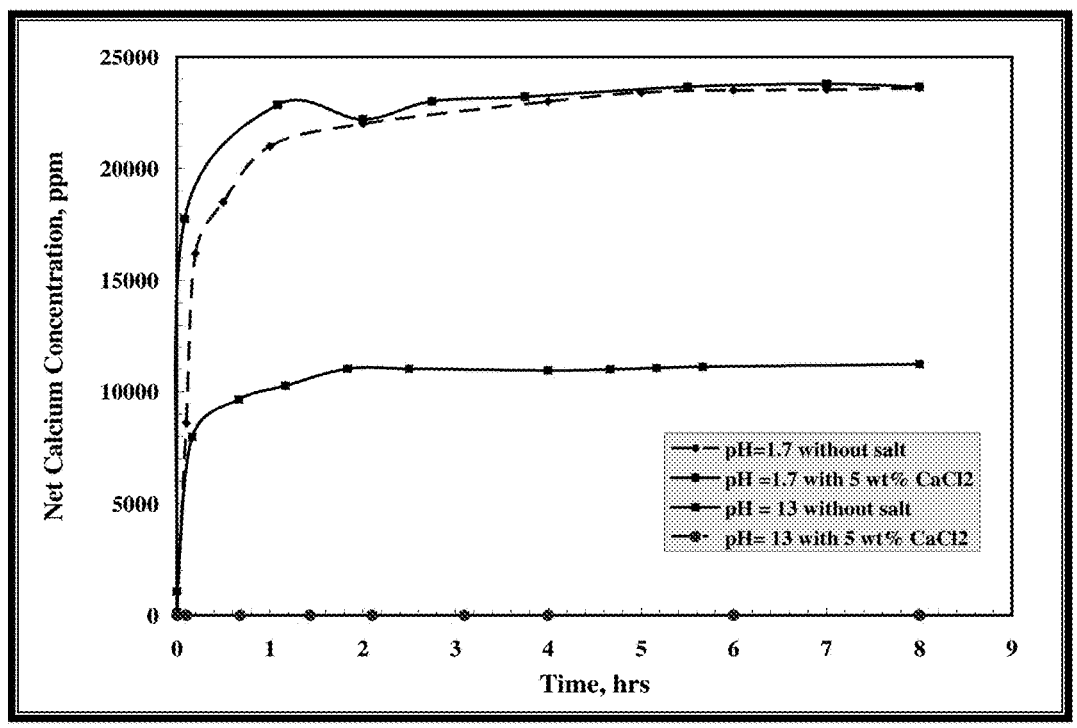
FIG. 5 shows the effect of adding 5 wt % calcium chloride on the calcium concentration for samples that were collected from the reactor during the reaction of GLDA of different pH with calcite at 180° F.

FIG. 5 shows the effect of adding 5 wt % calcium chloride on the calcium concentration for samples that were collected from the reactor during the reaction of GLDA of different pH with calcite at 180° F. For GLDA at pH of 1.7, it is shown that there is a small effect on the net calcium concentration (total dissolved calcium-calcium from 5 wt % $CaCl_2$). The calcium concentration increased slightly in the first two hours, as the GLDA chelated small amounts from the calcium in solution, after that the concentration was almost the same for the two cases (with and without calcium chloride). In the case of pH 13, GLDA chelated all the calcium in solution from the calcium chloride and did not react with the calcite. The weight of the crushed calcium carbonate sample was the same before and after the test. The reaction at high pH is due principally to chelation and little acidic dissolution occurs. The existence of calcium chloride in solution affects the reaction of GLDA (pH 13) with calcite greatly; it can completely hinder the reaction, as it is easier for the GLDA to chelate the calcium in solution rather than to chelate the calcium from the calcium carbonate. From FIG. 5, the amount of chelated calcium is the same during the whole test time and it is equal to the amount of calcium in the 5 wt % $CaCl_2$.

Example 6—Effect of Chelate

Figure 6:
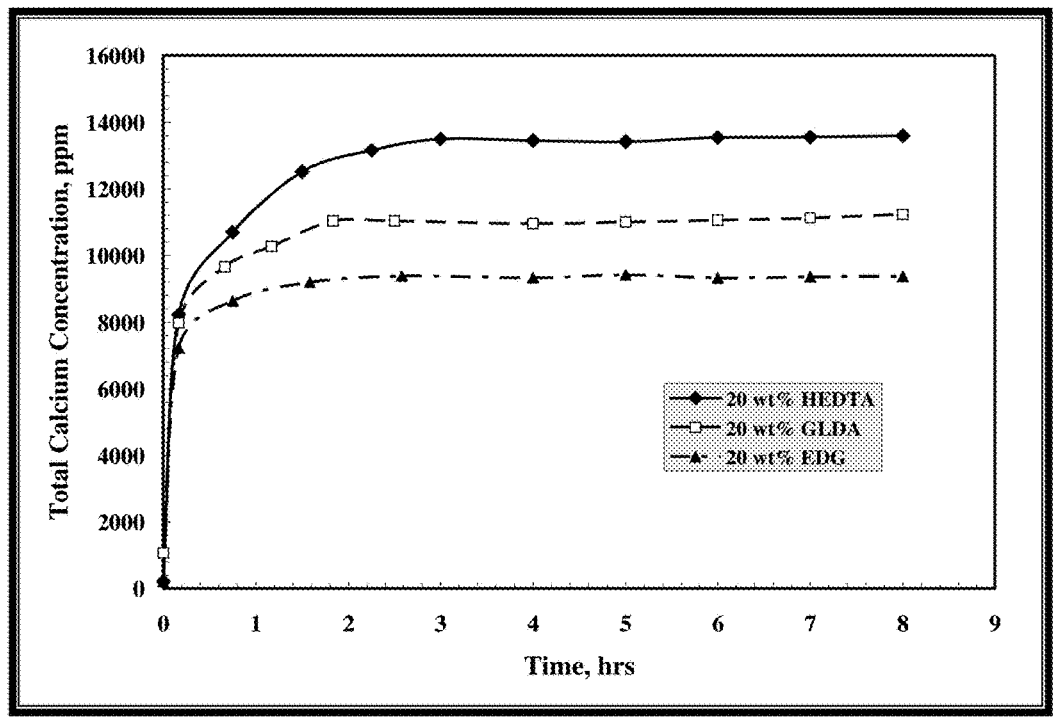
FIG. 6 shows a comparison between 20 wt % GLDA (pH=13), 20 wt % HEDTA (pH=11) and 20 wt % of ethanol diglycinic acid (EDG) (pH=11) at 180° F.

FIG. 6 shows a comparison between 20 wt % GLDA (pH=13), 20 wt % HEDTA (pH=11) and 20 wt % EDG (pH=11) at 180° F. Chelate/calcite with a 1.5 molar ratio were put in the reaction flask at 180° F. The ability of GLDA to dissolve calcite is less than HEDTA (with two nitrogen atoms) but is greater than EDG (also like GLDA with only one nitrogen atom). GLDA is a good calcite dissolver compared to other chelating agents; in addition it is safer to use than EDG and more readily biodegradable than HEDTA.

Example 7—Thermal Stability Tests

Figure 7:
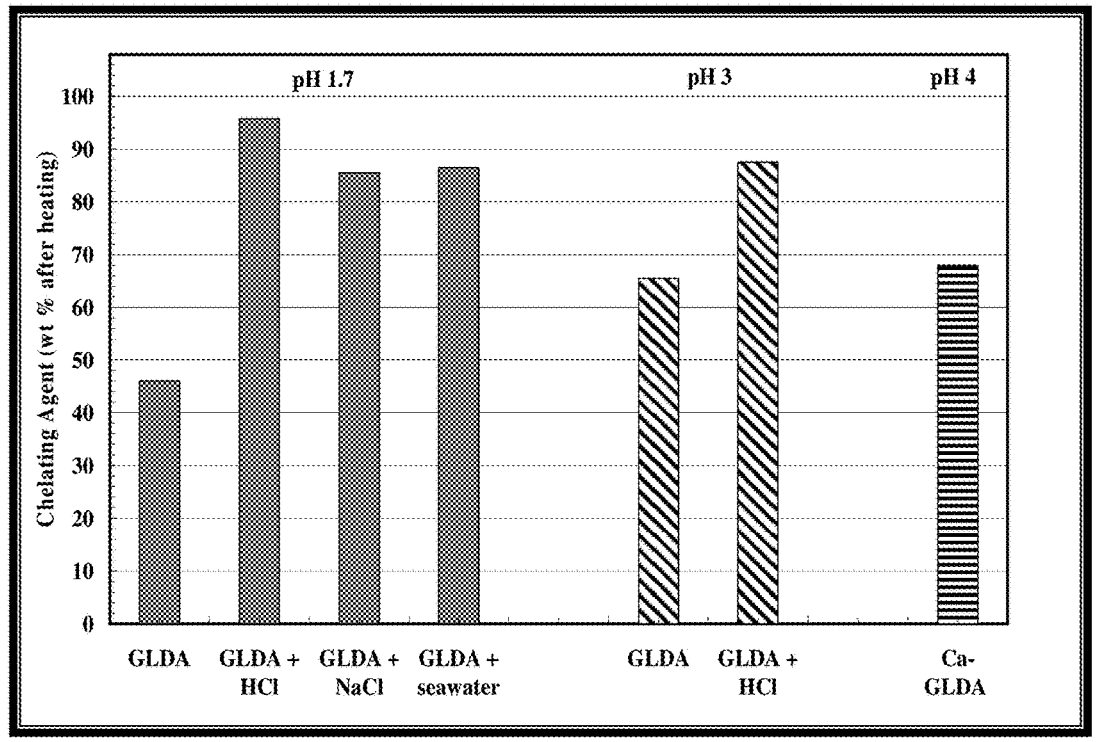
FIG. 7 demonstrates that the thermal stability of GLDA is influenced favorably in high ionic strength solutions like seawater and brines.

The thermal stability of GLDA is comparable to the thermal stability of the better known chelating agent HEDTA. The results presented in FIG. 7 demonstrate that the thermal stability of GLDA is influenced favorably in high ionic strength solutions like seawater and brines. Once applied in downhole stimulation of carbonate rock, GLDA will be complexed to calcium giving adequately thermally stable Ca-GLDA solutions.

Example 8—Core Flood Experiments

Figure 9:
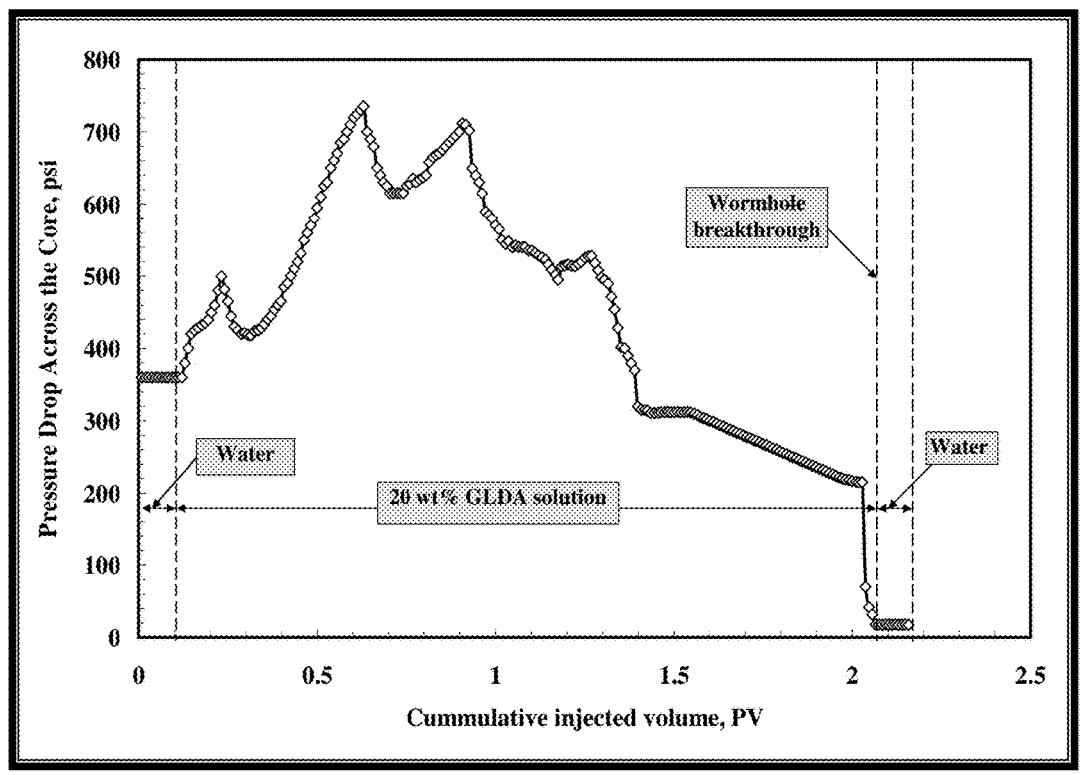
FIGS. 9 and 10 show the pressure drop across the core during the GLDA injection at 2 $cm^3$/min and 200° F. and 3 $cm^3$/min and 220° F., respectively.
Figure 10:
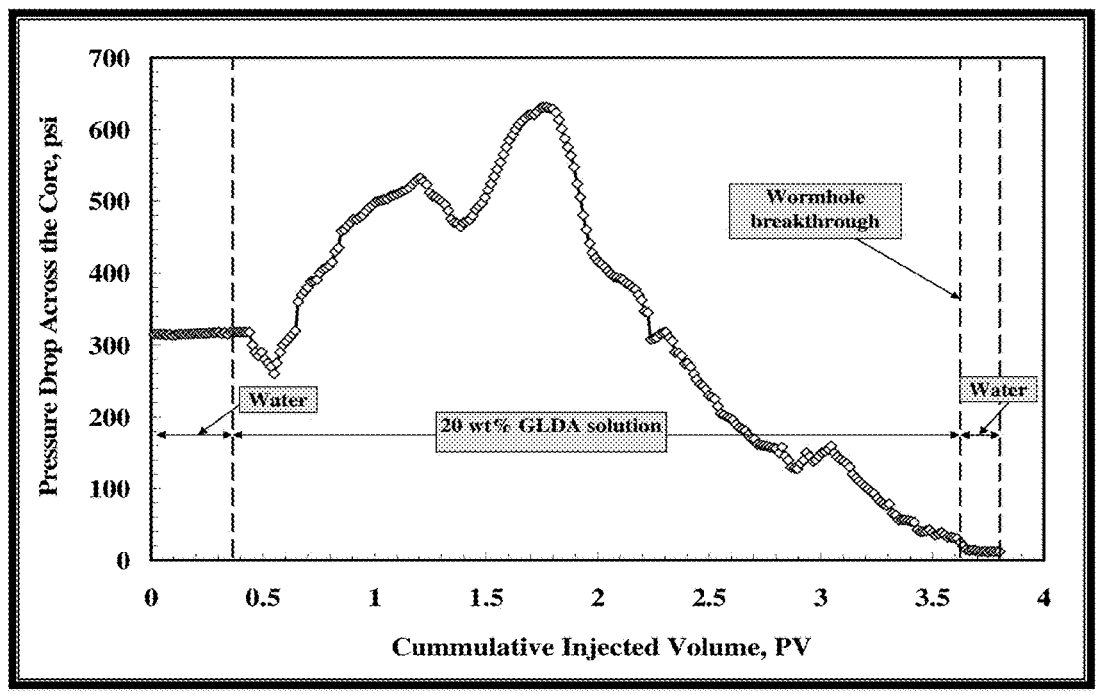

FIG. 8 gives the data for the two core flood tests. FIGS. 9 and 10 show the pressure drop across the core during the GLDA injection at 2 $cm^3$/min and 200° F. and 3 $cm^3$/min and 220° F., respectively. The pressure drop initially increases during the introduction of GLDA and then decreases until the GLDA penetrates through the core (start of wormhole formation). The increase in the pressure drop can be attributed to the increased viscosity and density of the reacted GLDA solution. The viscosity and density measurements of GLDA (pH 1.7) with different concentrations of calcium at room temperature are reported in FIG. 11. As the amount of soluble calcium increases the viscosity of the solution is also increased and in turn the pressure drop across the core increased. During the reaction of GLDA with calcite, the wormholes begin to form and the pressure drop should begin to decrease, but the propagation rate of the wormhole is very small. As wormhole formation progresses, the overall pressure drop rises more slowly until it begins to decrease. After the breakthrough, with all the calcium flushed out, the pressure drop reached 17 psi for 2 $cm^3$/min and 12 psi for 3 $cm^3$/min. The core permeability increased by 21 times from 6.1 to 130 md at 2 $cm^3$/min test and increased from 10.2 to 275 md at 3 $cm^3$/min test.

Figure 12:
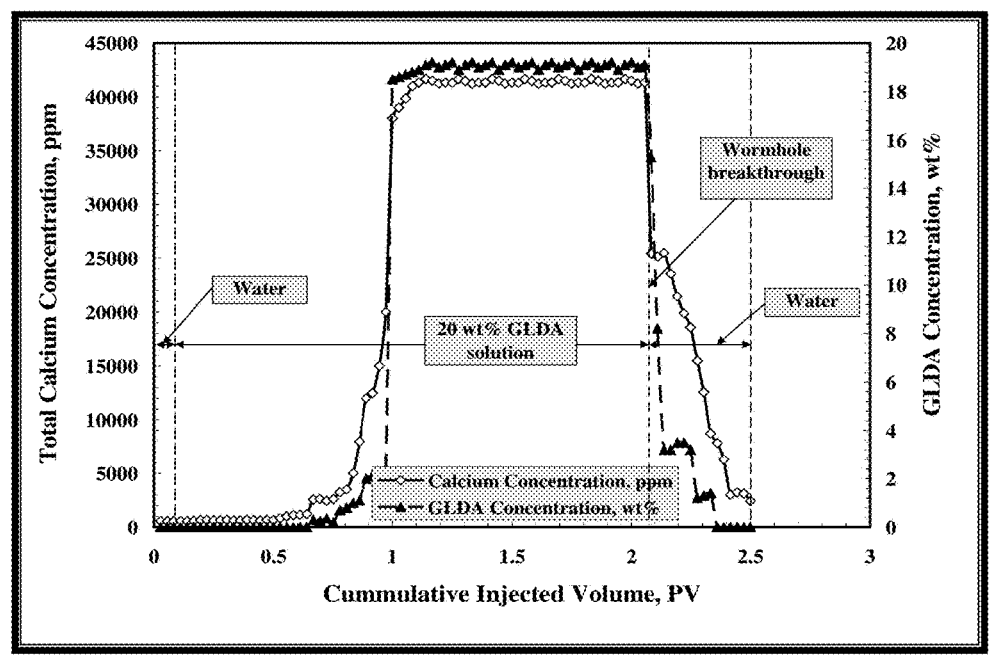
FIGS. 12 and 13 show the calcium and the GLDA concentration for two core flood tests.
Figure 13:
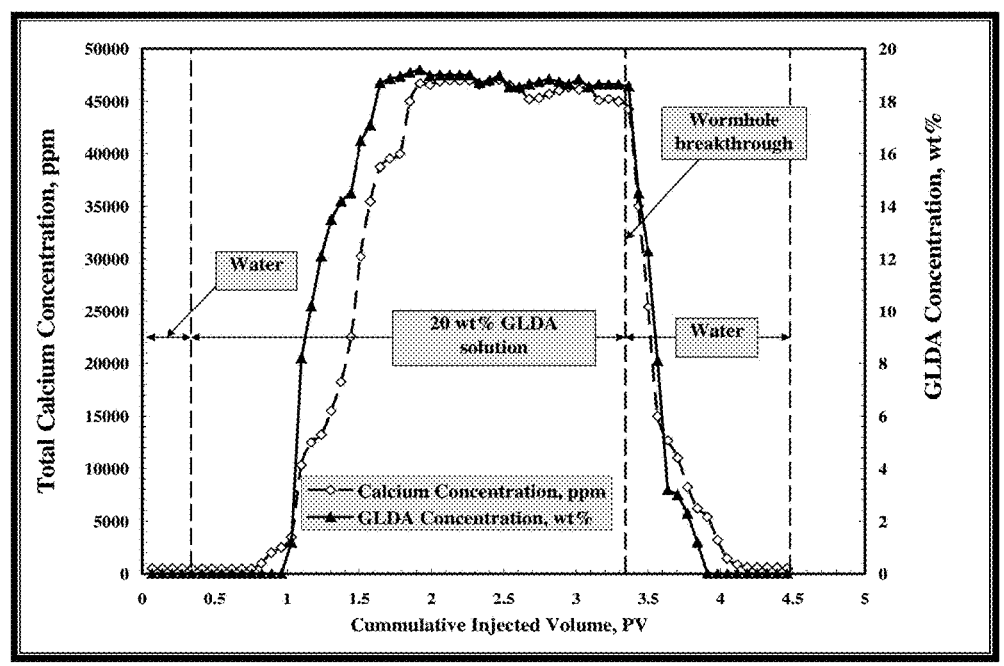

FIGS. 12 and 13 show the calcium and the GLDA concentration for the two core flood tests. As shown by these figures, the calcium and GLDA concentrations reach a maximum at the breakthrough and start to decrease after the formation of wormholes. Introduction of de-ionized water further reduces the concentrations of calcium and GLDA until they reach the minimum value. The chelant concentration for the two core flood tests reaches a plateau value of 19 wt % for both tests at 200 and 220° F. which is 95% of the original concentration. This indicates GLDA has a very good thermal stability during core flood tests in good agreement with separate thermal stability test data. For the first test at 2 $cm^3$/min and 200° F., it takes 2.1 PV to form the wormhole while 3.6 PVs are required at 3 $cm^3$/min and 220° F.

Figure 14:
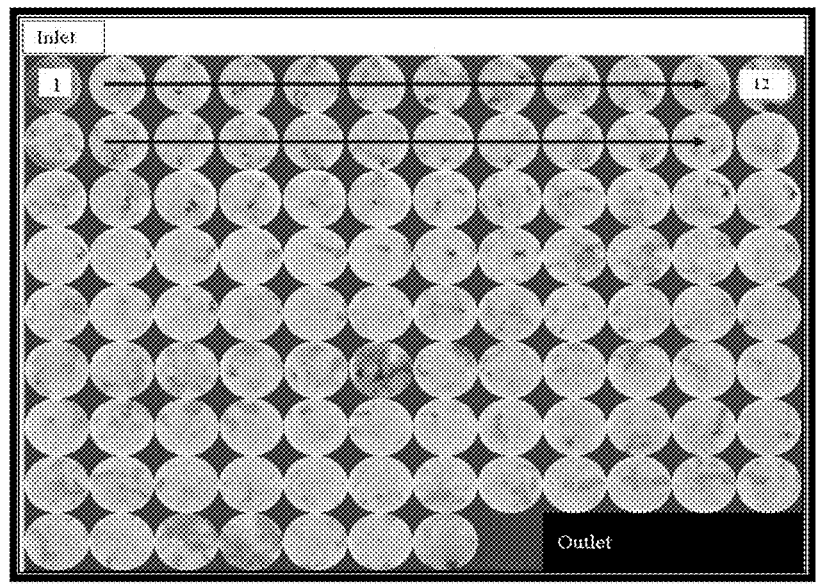
FIG. 14 shows the CT scan for the cores after the core flood test with GLDA.
Figure 14:
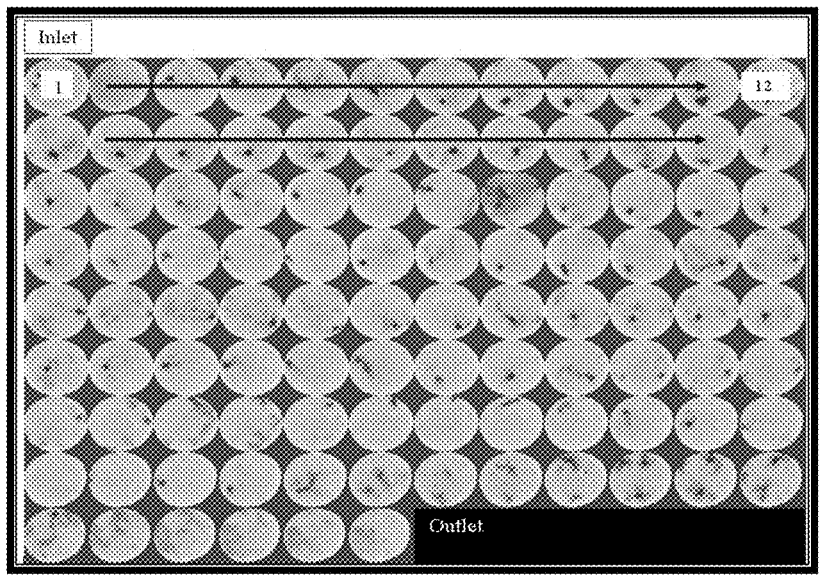
Figure 15:
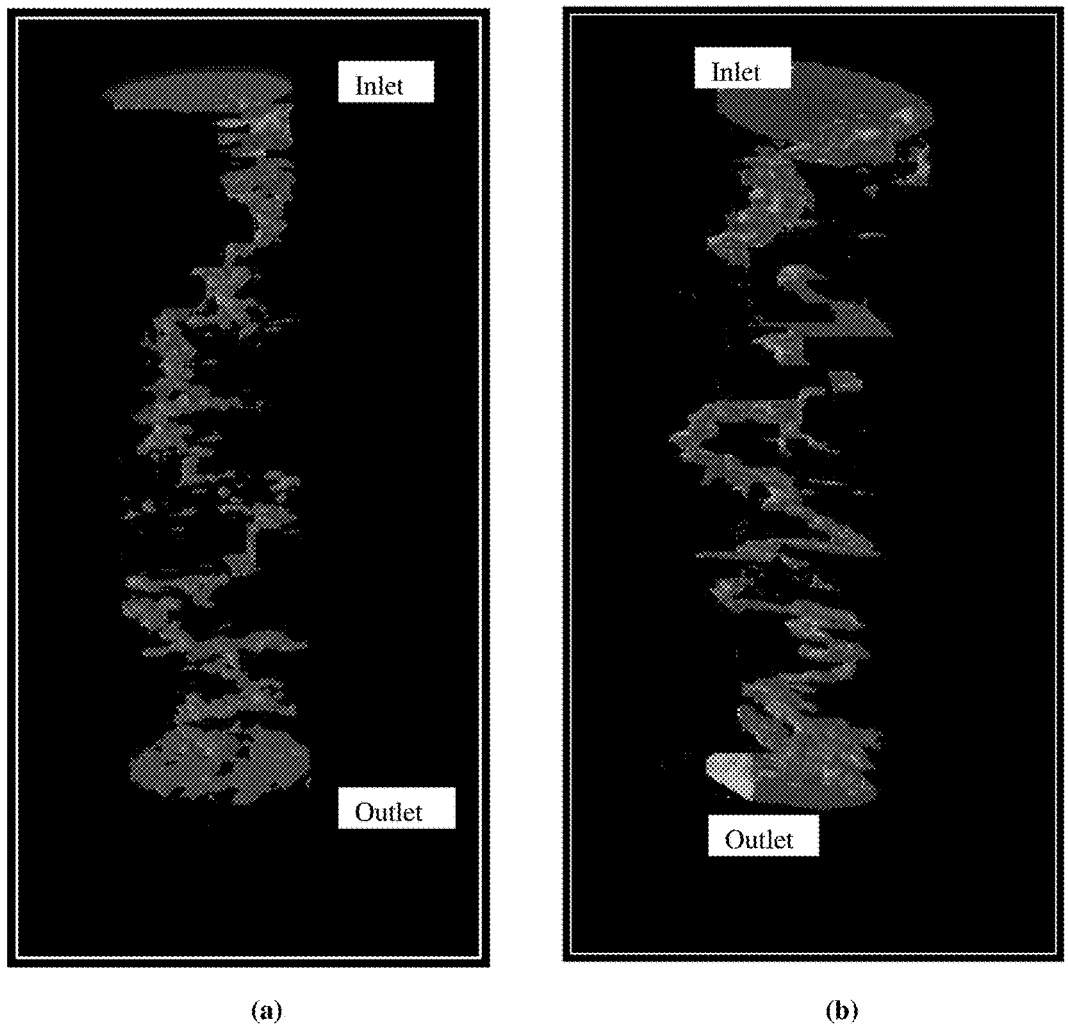
FIG. 15 shows the 3D CT scan for the cores after the treatment.

FIG. 14 shows the CT scan for the cores after the core flood test with GLDA. The wormhole formation after the treatment is indicated by the blue color. FIG. 15 shows the 3D CT scan for the cores after the treatment. The wormhole has greater diameter in case of 3 $cm^3$/min and 220° F., as there was more calcium (dissolved) in the effluent samples than the 2 $cm^3$/min and 200° F. The amount of calcium that was dissolved at 2 $cm^3$/min was 7 g and 11.5 g for 3 $cm^3$/min.

Example 9—Effect of pH Values of GLDA Solutions

Core flood experiments with GLDA fluids of different pH (1.7-13) were run. FIG. 16 gives the data for 6 in. long cores for different pH levels of 20 wt % GLDA solutions. Six core flood tests were run, two for each pH at 180 and 250° F. The different pH values represent different forms of GLDA: pH=1.7 ($H_4$GLDA-acid form with a molecular weight of 263), pH=3 ($NaH_3$GLDA with a molecular weight of 285), and pH=13 ($Na_4$GLDA-salt form with a molecular weight of 351). For each core flood experiment, the pressure drop across the core was plotted using lab-view software. Samples of the core flood effluent were analyzed for total and chelated calcium concentrations. The concentration of GLDA in the effluent samples was also measured to determine its stability, as well as density and pH.

Figure 17:
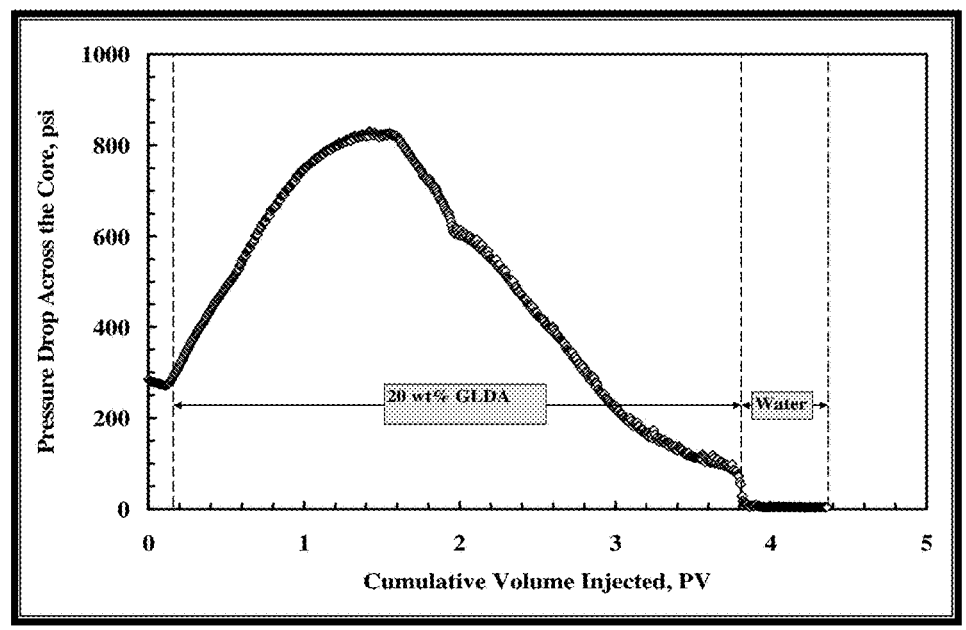
FIG. 17 shows the pressure drop across the core during the core flood experiment for 20 wt % GLDA at pH=1.7 at 2 $cm^3$/min and 180° F.

FIG. 17 shows the pressure drop across the core during the core flood experiment for 20 wt % GLDA at pH=1.7 at 2 cm³/min and 180° F. The pressure drop initially increased during the introduction of GLDA and then decreased until the GLDA penetrated through the core. The increase in the pressure drop might be attributed to the increased viscosity of the reacted GLDA solution. The viscosity and density measurements of GLDA (pH=1.7) with different concentrations of calcium at room temperature are reported in FIG. 18. As the calcite was dissolved and the calcium concentration of the GLDA fluid increased, so did the viscosity of the fluid. At the same time during the reaction of GLDA with calcite, wormholes were formed and the pressure drop was then expected to decrease. The net result on whether the pressure drop was increasing, stabilizing or decreasing depends on the extent of dissolution in the length of the core. It was noted that as soon as the calcium started to come out of the core the pressure drop started to decrease. This was due to increased permeability caused by wormholing as it began to dominate over the increased viscosity of the GLDA fluid.

Figure 19:
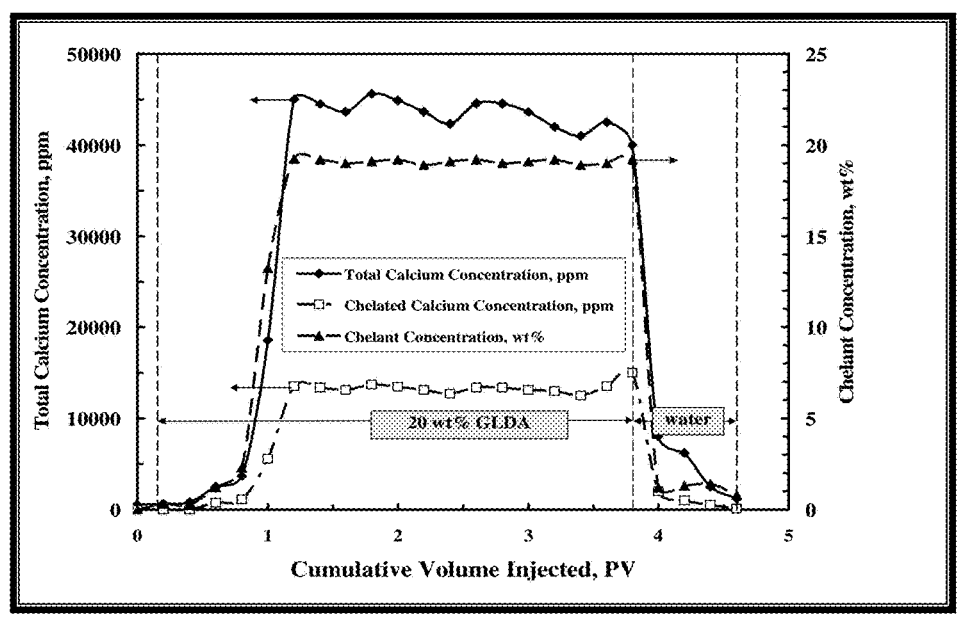
FIG. 19 shows the total calcium concentration, chelated calcium concentration and the GLDA concentration in the core effluent samples for the experiment shown in FIG. 17.

FIG. 19 shows the total calcium concentration, chelated calcium concentration and the GLDA concentration in the core effluent samples for the experiment shown in FIG. 17. The total calcium concentration reached a maximum value of 45,000 ppm indicating the effectiveness of GLDA to dissolve calcite under these conditions. At an effluent pH of 4.5, nearly 30% of the total dissolved calcium was found to be complexed by GLDA. The amount of chelated or complexed calcium was determined by subtracting the free calcium concentration from the total calcium concentration. The concentration of GLDA in the core effluent samples after the core flood test reached the 20 wt % injection concentration indicating the stability of GLDA during the core flood treatment.

Figure 20:
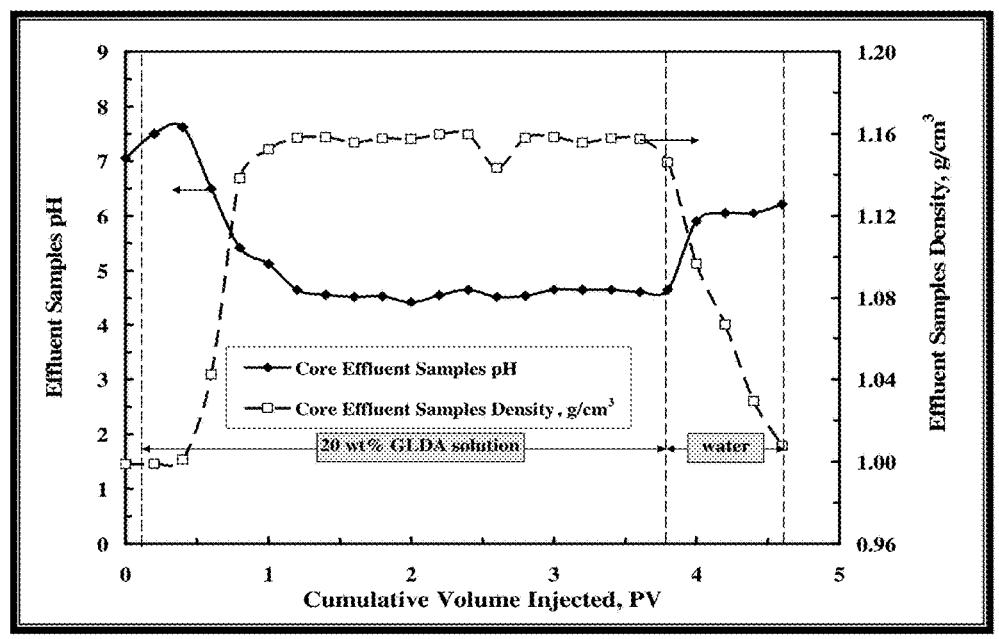
FIG. 20 shows the density and pH of the core flood effluent samples for the embodiment of FIG. 19.

FIG. 20 shows the density and pH of the core flood effluent samples for the same experiment. As calcium and GLDA breakthrough at PV=1 the density of the effluent samples increased due to the presence of calcium ions in solution. The pH stabilized at a value around 4.5 because of the buffering effect of $CO_2$. At low pH, the theoretical reaction between calcium carbonate and a polycarboxylic acid is dictated by H+ according to Eq. 1:

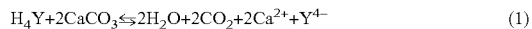

$$H_4Y + 2CaCO_3 \leftrightarrows 2H_2O + 2CO_2 + 2Ca^{2+} + Y^{4-} \quad (1)$$

where $H_4Y$ is a tetracarboxylic acid.

Figure 21:
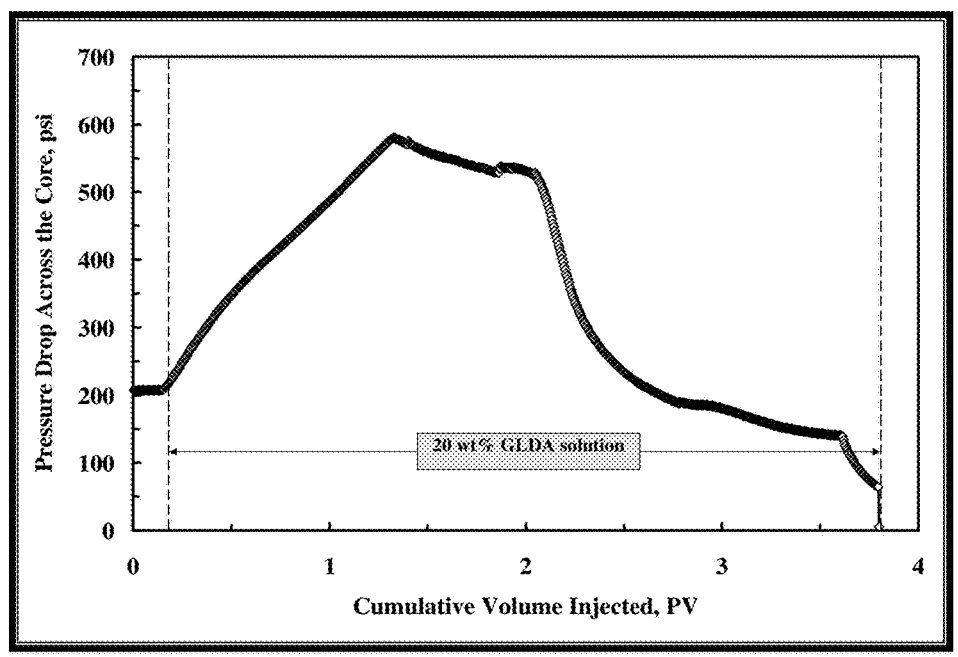
FIG. 21 shows the pressure drop across the core during the flooding experiment.

A similar behavior in core flooding experiment was observed with a 20 wt % GLDA solution at pH=3. FIG. 21 shows the pressure drop across the core during the flooding experiment. As before, the pressure drop increased across the core, but in this case it was much higher than at pH=1.7. The increase in the pressure drop is attributed to the viscosity of GLDA at pH 3 at room temperature being greater than the viscosity of GLDA at pH of 1.7 as shown in FIG. 18.

Figure 22:
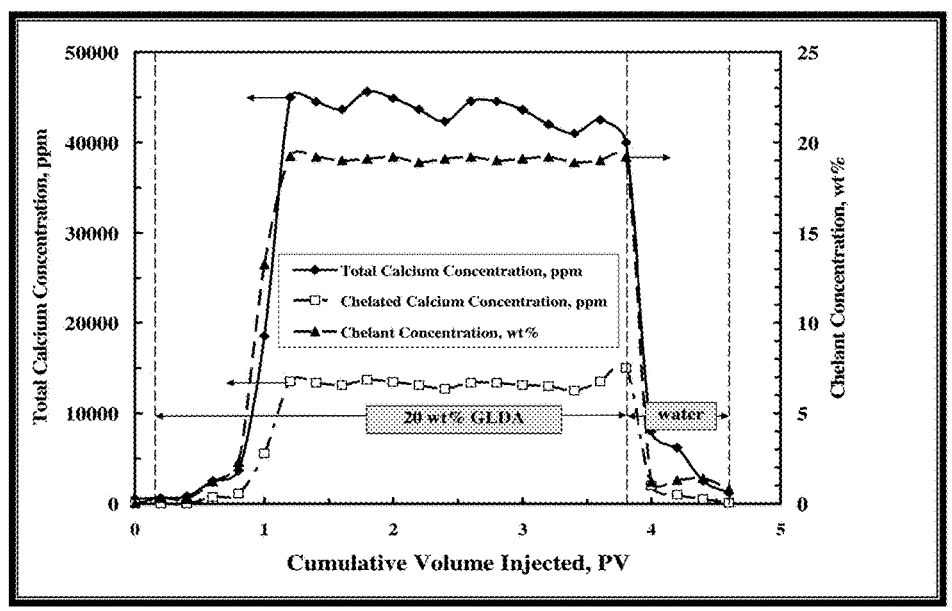
FIG. 22 shows the total calcium concentration, chelated calcium concentration and the GLDA concentration in the core effluent samples for these conditions.

FIG. 22 shows the total calcium concentration, chelated calcium concentration and the GLDA concentration in the core effluent samples for these conditions. In this case, the total calcium concentration reached a maximum value of 35,000 ppm, which was less than that observed at pH=1.7. The effluent pH=5.2 resulted in 40% of calcium being chelated by GLDA, versus 30% at pH=1.7. Again, the GLDA concentration after the core flood effluent approached the 20 wt % showing a good stability of the GLDA chelate under these conditions.

Figure 23:
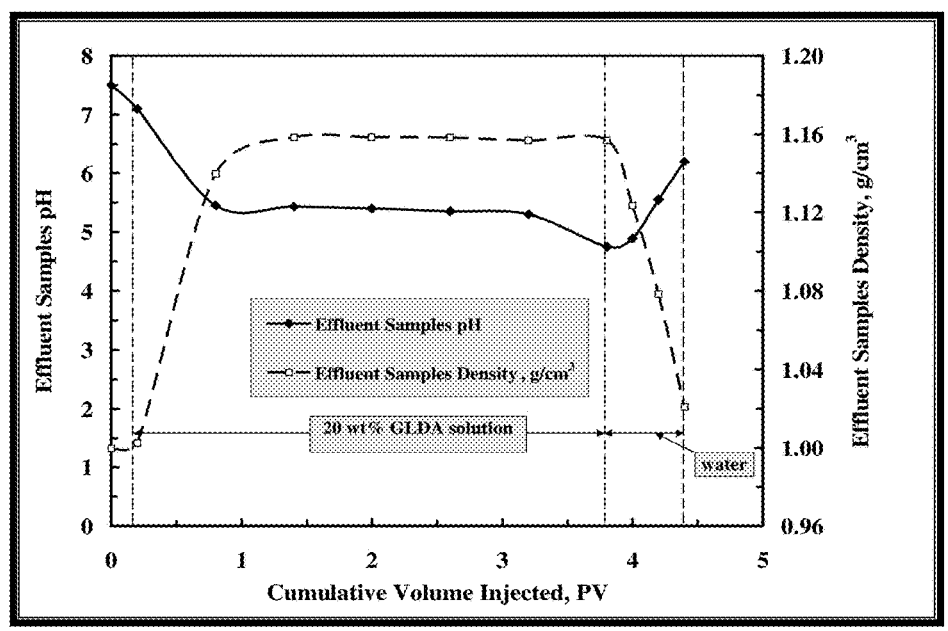
FIG. 23 shows the density and pH for the core flood effluent samples for 20 wt % GLDA solution (pH=3) at 2 $cm^3$/min and 180° F.

FIG. 23 shows the density and pH for the core flood effluent samples for 20 wt % GLDA solution (pH=3) at 2 cm³/min and 180° F. The density of the GLDA solution increased to its maximum value (1.16 g/cm³) after the GLDA broke through the core. The effluent pH ranged from pH 5 to 5.5 being greater than the pH 4.5 observed when pH=1.7 GLDA fluid was used. The pH in this case was greater than that when pH=1.7 was used because the amount of hydrogen attack to the calcite was lower with the GLDA of pH 3 than that with GLDA of pH 1.7 and the amount of evolved $CO_2$ was less than that evolved when the GLDA of pH=1.7 was used.

Figure 24:
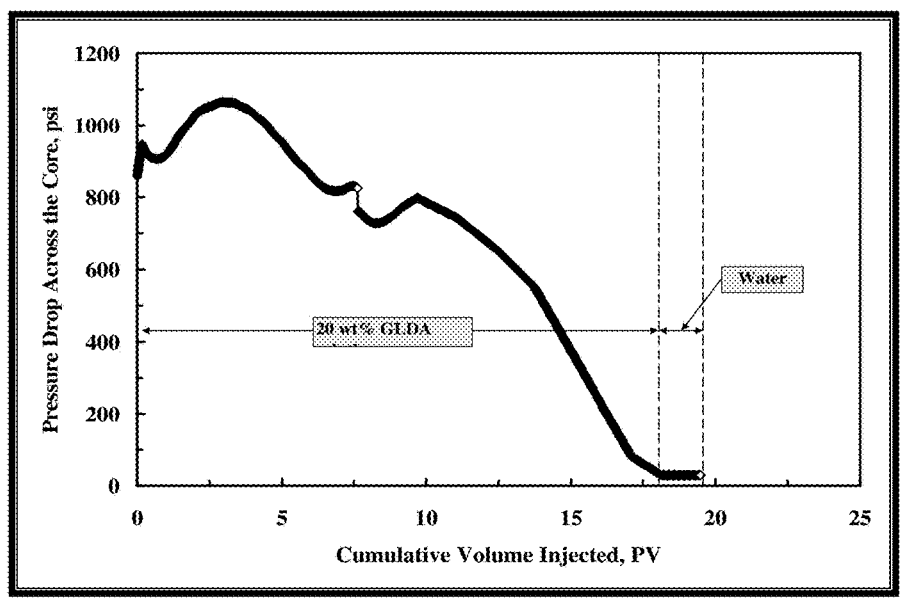
FIG. 24 shows the pressure drop across the core during the core flood experiment for 20 wt % GLDA solutions at pH 13 at 2 $cm^3$/min and 180° F.
Figure 25:
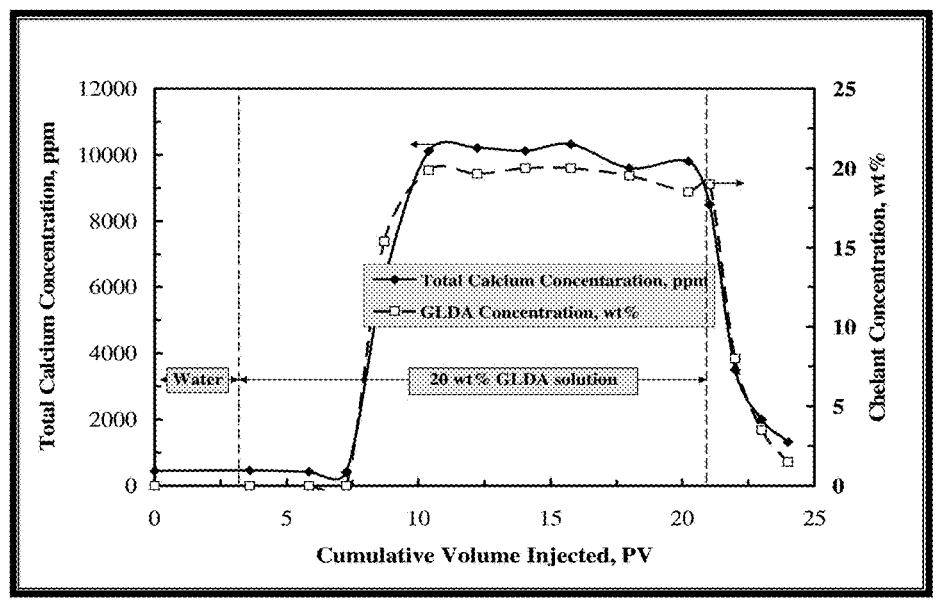
FIG. 25 shows the maximum amount of dissolved calcium in the case of 20 wt % GLDA of pH=13 was 10,000 ppm.
Figure 26:
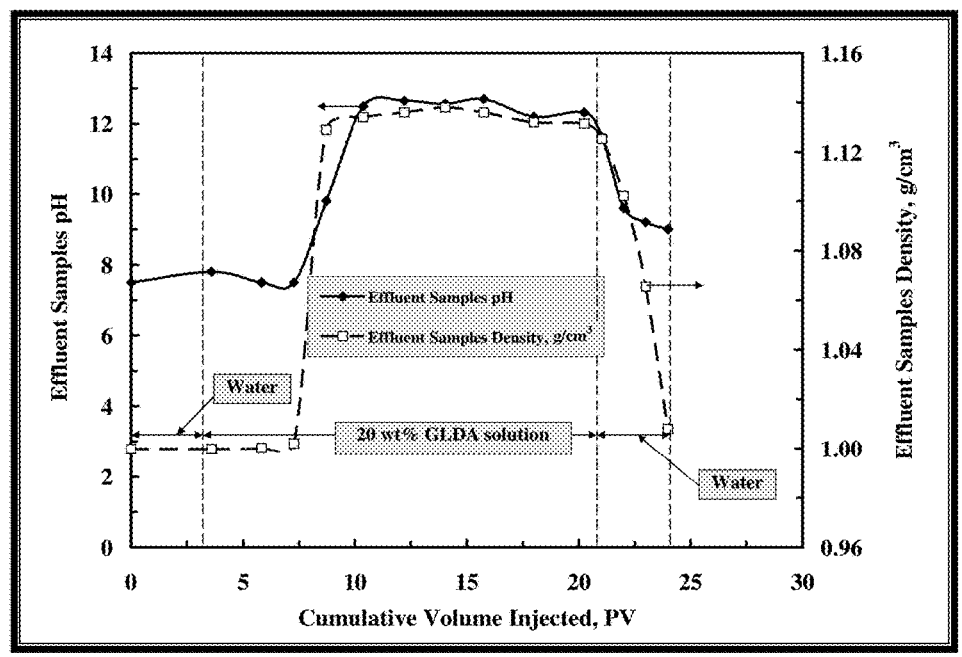
FIG. 26 shows the pH of the core effluent samples.

FIG. 24 shows the pressure drop across the core during the core flood experiment for 20 wt % GLDA solutions at pH 13 at 2 cm³/min and 180° F. The behavior of the pressure drop after starting the injection of this fluid was somewhat different than that observed with fluids at pH 1.7 and 3. The increase in the pressure drop at pH 13 was small compared to the lower pH fluids. The pressure drop reached 1,050 psi after about 3 PV and then began to slowly decrease. This can be attributed to the viscosity of 20 wt % GLDA, pH=13 is smaller than that in case of pH=1.7 and 3, see FIG. 18. From FIG. 25, the maximum amount of dissolved calcium in the case of 20 wt % GLDA of pH=13 was 10,000 ppm, the viscosity slightly increased, therefore, the increase in the pressure drop was not large. Also, the total calcium dissolved equaled to the amount of chelated calcium because in this case the dissolution mechanism was due to chelation only. This can be confirmed by FIG. 26, in which the pH of the core effluent samples was 12.5 to 13. In this case, there was no significant amount of $CO_2$ to buffer the solution. Also, the density of the effluent samples was lower compared with that in case of pH=1.7 and pH=3 as there was less dissolved calcium concentration in the effluent samples.

Figure 27:
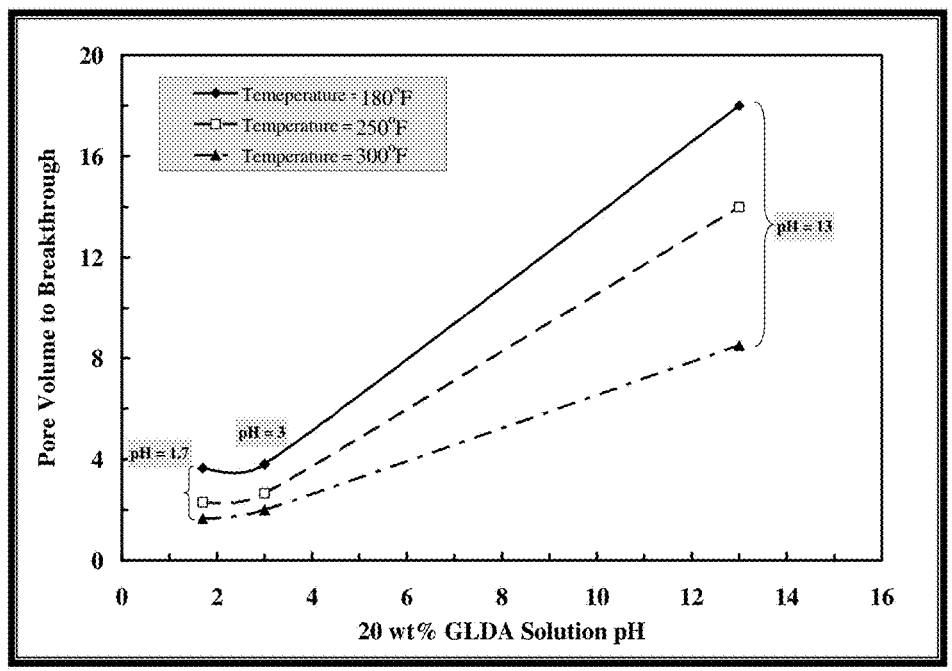
FIGS. 27-29 summarize the effect of the pH of the GLDA solutions on the dissolution of calcite and wormhole formation in calcium carbonate cores.
Figure 28:
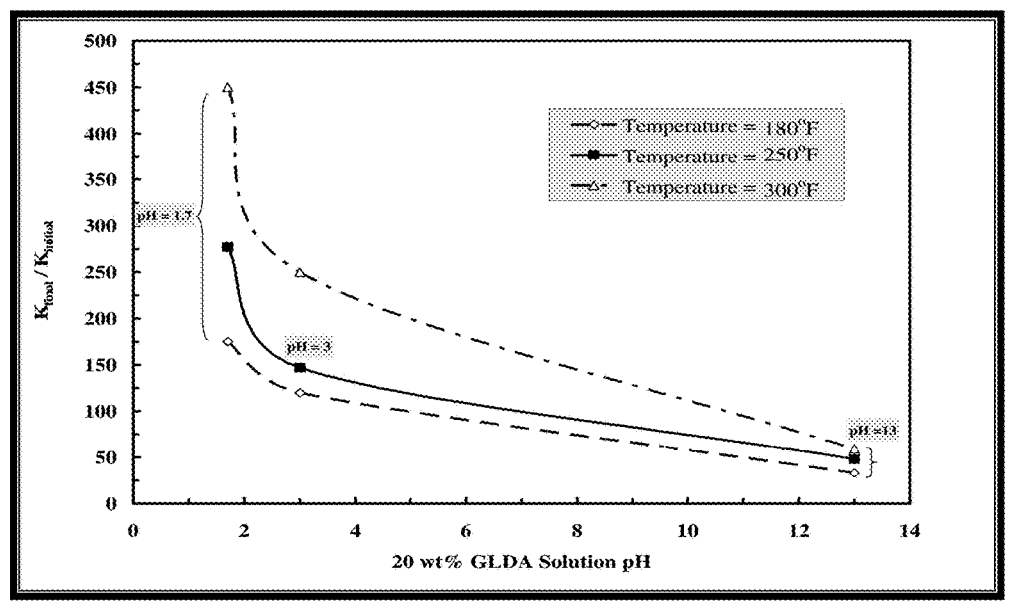
Figure 29:
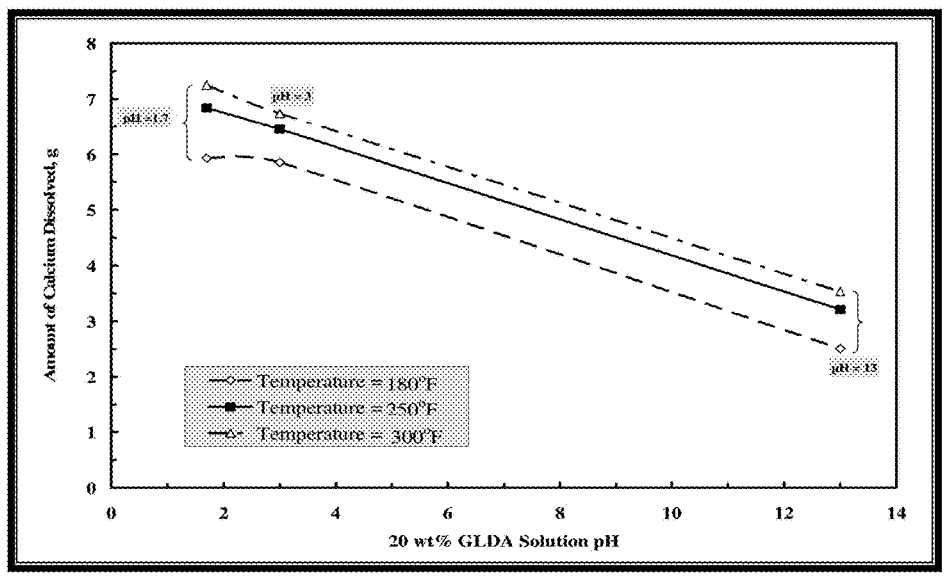

FIGS. 27-29 summarize the effect of the pH of the GLDA solutions on the dissolution of calcite and wormhole formation in calcium carbonate cores. The volume of 20 wt % GLDA required to form wormholes increased as the pH was increased. Specifically, the volume of fluid required at pH=1.7, 3 and 13 was 3.65, 3.8 and 18 PV, respectively. We can conclude that the acid form of GLDA (pH=1.7) was more effective in dissolving calcite than at pH=13. The enhanced dissolution of calcite at pH=1.7 was due to the H+ attack, but was due nearly entirely to chelation at pH=13. Therefore, the reaction was very slow at pH=13 and it took this large PV to form wormholes.

FIG. 29 shows the amount of dissolved calcium was maximum at pH=1.7 but minimum at pH=13. The dissolution of calcite at high pH (pH=13) was due to complexation only.

Example 10—Effect of Temperature

Compared to Example 9, similar core flooding experiments were performed at 250 and 300° F. Higher temperatures enhanced calcite dissolution by GLDA at all pHs examined. FIGS. 27 to 29 show the effect of increasing temperature on the performance of GLDA. As the temperature was increased from 180 to 300° F., the volume of GLDA required to form wormholes decreased to 1.65, 2 and 8.5 PV for pH=1.7, 3, and 13, respectively. This indicated that GLDA was very effective at wormhole creation at high temperatures and required less pore volume than at low temperatures. The amount of dissolved calcium increased by 1.32, 0.89, and 1.02 g for pH=1.7, 3 and 13, respectively as the temperature was increased from 180 to 300° F. The permeability ratio attained its highest value at 300° F. and pH=1.7.

Figure 30:
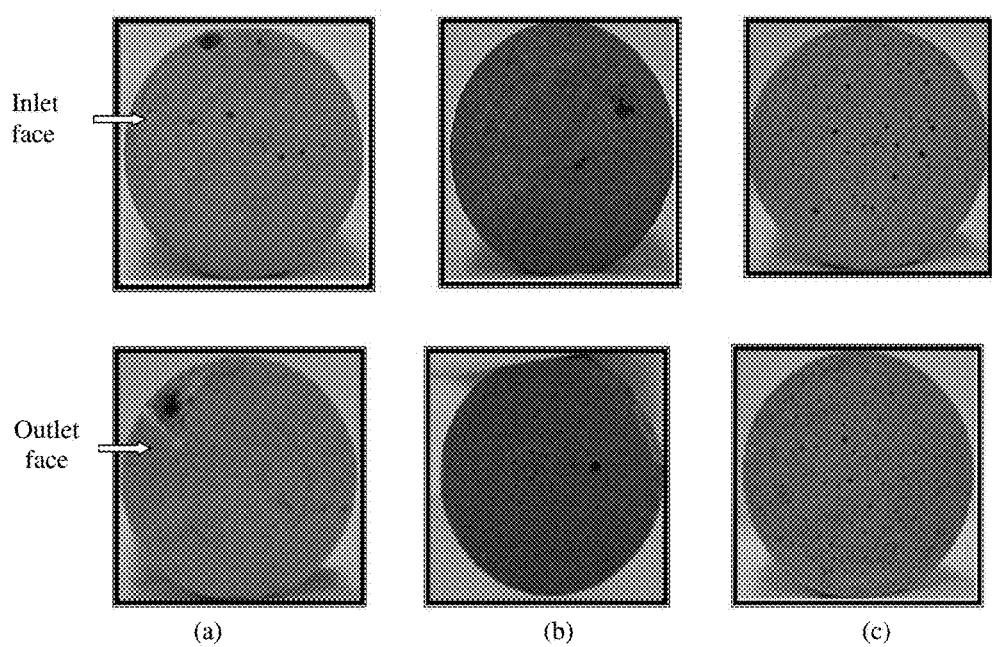
FIG. 30 shows the core inlet and outlet faces after the core flood treatments for three different cores with 20 wt % GLDA at 2 $cm^3$/min for different GLDA pH (1.7, 3, and 13).

A GLDA solution at pH=3 was very effective in creating wormholes at 180, 250, and 300° F. compared with other chelating agents. The amount of 20 wt % GLDA at pH=3 required to breakthrough the core was 3.8 and 2.65 PV at 180 and 250° F., respectively at a flow rate of 2 cm$^3$/min. The results are in agreement with the same trends obtained for other chelates such as 20 wt % Na$_3$HEDTA (pH=2.5). Therefore, GLDA at pH 3 was found to be very effective and required less volume to create wormholes through the cores. FIG. 30 shows the core inlet and outlet faces after the core flood treatments for three different cores with 20 wt % GLDA at 2 cm$^3$/min for different GLDA pH (1.7, 3, and 13). The wormhole had the maximum diameter at pH of 1.7 and there were very small wormholes in case of pH=13.

Example 11—Stimulation of Dolomite Cores

Figure 31:
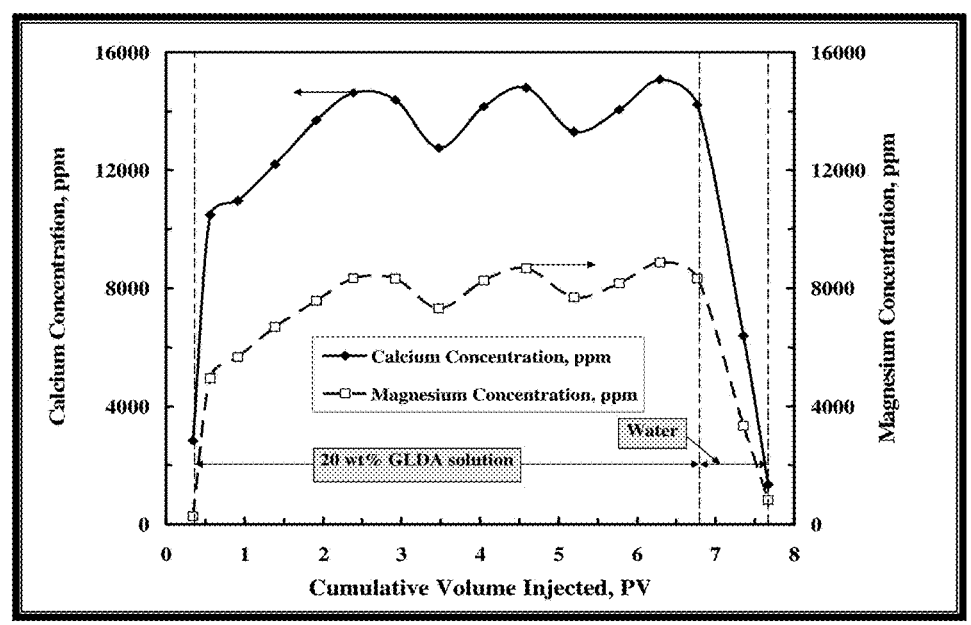
FIG. 31 shows the total concentrations of calcium and magnesium in the core flood effluent samples.

A GLDA solution at pH=1.7 was used to stimulate a 6 in. dolomite core having an initial permeability of 45 md and a porosity 30 vol % at 180° F. and 5 cm$^3$/min. FIG. 31 shows the total concentrations of calcium and magnesium in the core flood effluent samples. The 20 wt % GLDA (pH=1.7) effectively dissolved calcium and magnesium from the dolomite core, the total calcium concentration reached an average value of 15,000 ppm and the total magnesium concentration reached an average value of 9,000 ppm. At 5 cm$^3$/min and 180° F., 6.4 PV was required to create wormhole and breakthrough the core, yielding a final permeability of 400 md. Therefore, GLDA can be used to stimulate dolomite cores because it can effectively dissolve dolomite rock. Also, the GLDA concentration in the core effluent samples was measured and it was found to be close to the 20 wt % in core flood effluent samples. This indicated that the stability of the GLDA was not affected by changing the core type (calcite or dolomite). The amount of the dissolved calcium was 7.45 g and the amount of dissolved magnesium was 4.2 g. The molar ratio of the dissolved calcium to magnesium was 1.065 which is consistent with Ca having a higher complexation constant with GLDA, which is greater than that Mg-GLDA (5.2). Thus GLDA tends to prefer Ca over Mg.

Example 12—Stimulation of Long Calcite Cores

Figure 33:
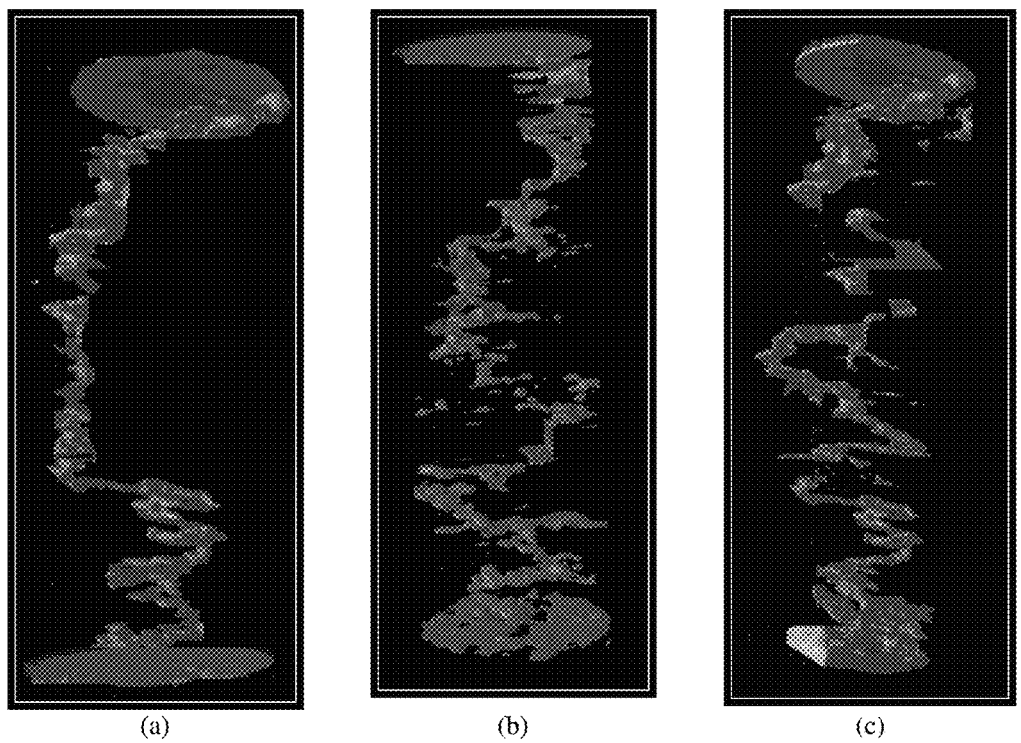
FIG. 33 shows the 3D pictures for the wormholes formed after the core flood experiments.

GLDA solutions of pH=1.7 and 3 were also used to create wormholes in long calcium carbonate cores of 20 in. length. FIG. 32 gives the data for three core flood experiments using 20 in. long cores. FIG. 33 shows the 3D pictures for the wormholes formed after the core flood experiments. GLDA was equally effective in creating wormholes in long cores and short cores. GLDA at pH 3 was very effective at 250° F. and 1 cm$^3$/min, only 2 PV was required to create wormholes through the core with core permeability increasing from 0.8 to 250 md. The same for 20 wt % GLDA of pH=1.7, flow rates of 2 and 3 cm$^3$/min at 200° F. were used to stimulate 20 in. long calcite cores. The pore volume required to breakthrough the core and create wormholes was 2.1 PV in case of 2 cm$^3$/min and 2.65 PV in case of 3 cm$^3$/min at 200° F. The low flow rate allows a longer contact time of the GLDA with the rock and less pore volume was required to create wormholes. From FIG. 31, the wormhole was uniform at low flow rate in the case of 1 cm$^3$/min and pH=3 at 250° F. Wormhole uniformity can be attributed to the increased contact time due to the low rate combined with the accelerated reaction rate at higher temperature. At higher rates, the wormhole is less uniform as the GLDA fluids go through the high permeable regions to dissolve calcite. Therefore, low rates are preferable for GLDA to work than higher rates.

Example 13—Stimulation of High Permeability Cores (Pink Desert Limestone)

Figure 35:
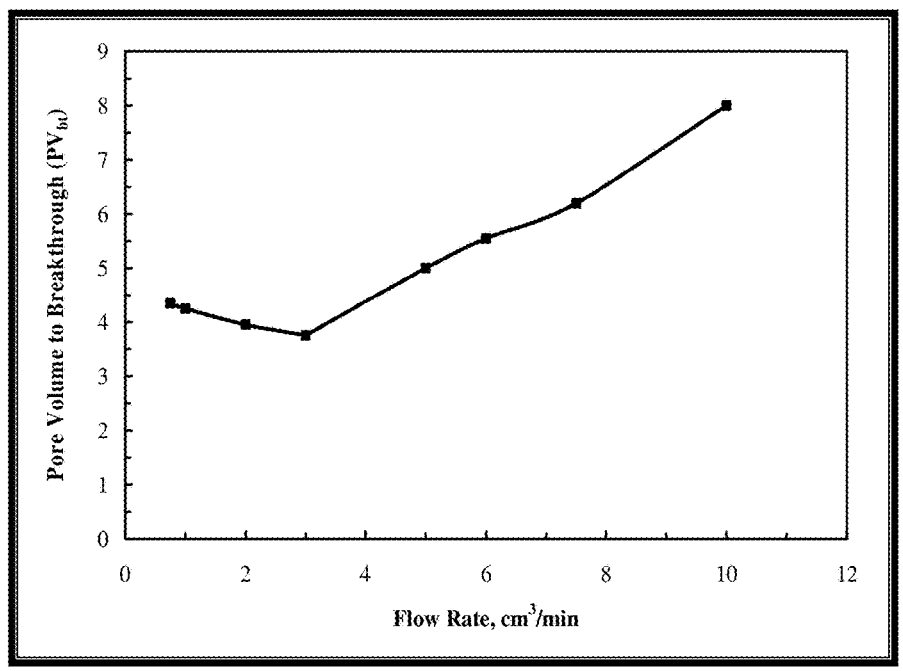
FIG. 35 shows the required pore volumes to breakthrough the core and form wormholes.
Figure 36:
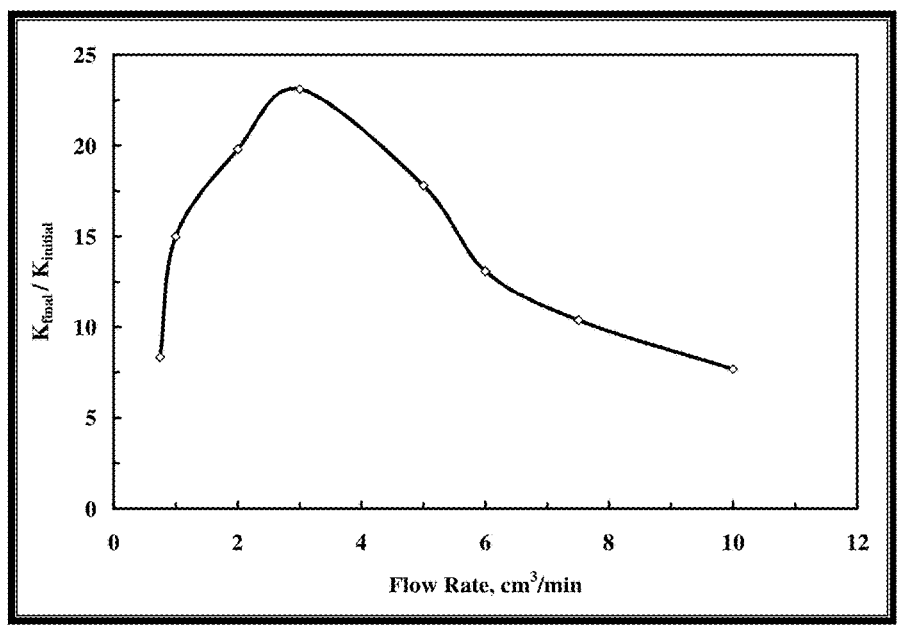
FIG. 36 shows the permeability increase after the core flood experiments for the Pink Desert cores by 20 wt % GLDA of pH 1.7.
Figure 37:
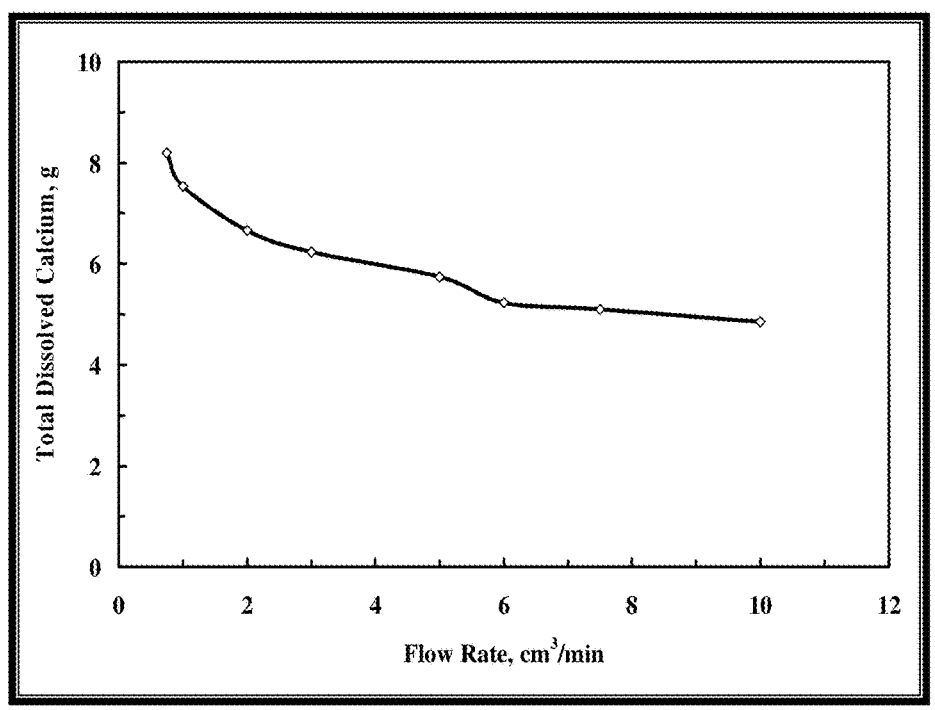
FIG. 37 shows the amount of calcium that was dissolved from the core.

FIG. 34 gives the data for the core flood experiments that were run on the Pink Desert cores by 20 wt % GLDA of pH 1.7 at 180° F. FIG. 35 shows the required pore volumes to breakthrough the core and form wormholes. The pore volumes required to create wormholes increased as the injection rate was increased from 0.75 to 10 cm$^3$/min. There was an optimum flow rate, which was 3 cm$^3$/min in the case of Pink Desert cores, above this rate, the pore volumes required to breakthrough the core and create wormholes increased. An extra four pore volumes were required to create wormholes as the flow rate was increased from 3 to 10 cm$^3$/min. Increasing the flow rate resulted in a decrease in the contact time between the GLDA and the calcite, therefore, more pore volumes were needed to compensate for the decrease in the contact time. From FIG. 35, it can be concluded that GLDA worked better at low flow rates than higher flow rates, and this can be attributed to the increased contact time. FIG. 36 shows the permeability increase after the core flood experiments for the Pink Desert cores by 20 wt % GLDA of pH 1.7. Also, this figure showed increase in the permeability ratio (final permeability/initial permeability) and then decrease in permeability. This confirmed the existence of an optimum flow rate at which we will get complete uniform wormholes with higher permeabilities than non-uniform or incomplete wormholes. FIG. 37 shows the amount of calcium that was dissolved from the core. The maximum amount of dissolved calcium was obtained at the lowest rate (0.75 cm$^3$/min) and the lowest one was obtained at the highest rate (10 cm$^3$/min). This confirmed that the GLDA worked better at low injection rates, the lower the flow rate the higher the contact time and the higher the amount of calcium that will be dissolved.

Figure 40:
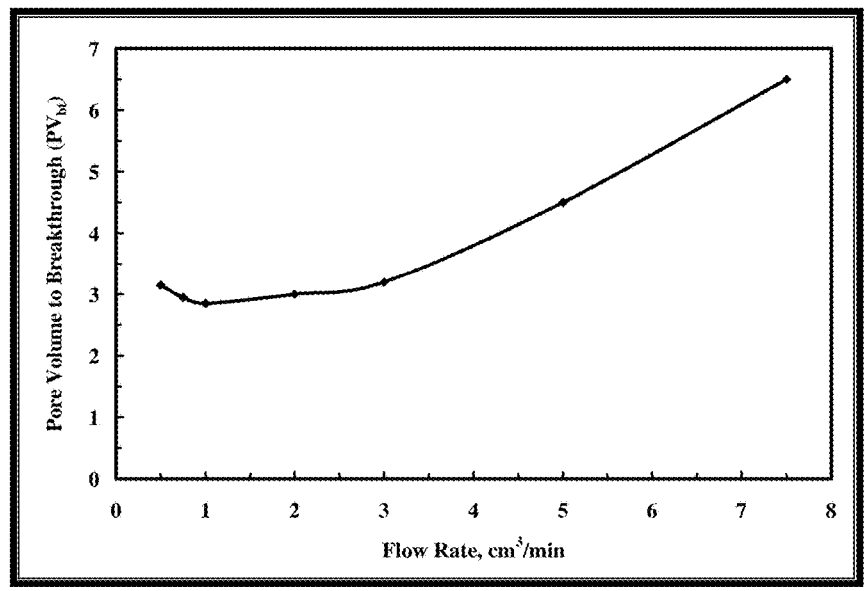
FIG. 40 shows the amount of 20 wt % GLDA at pH 1.7 to create wormholes and to breakthrough the core.
Figure 41:
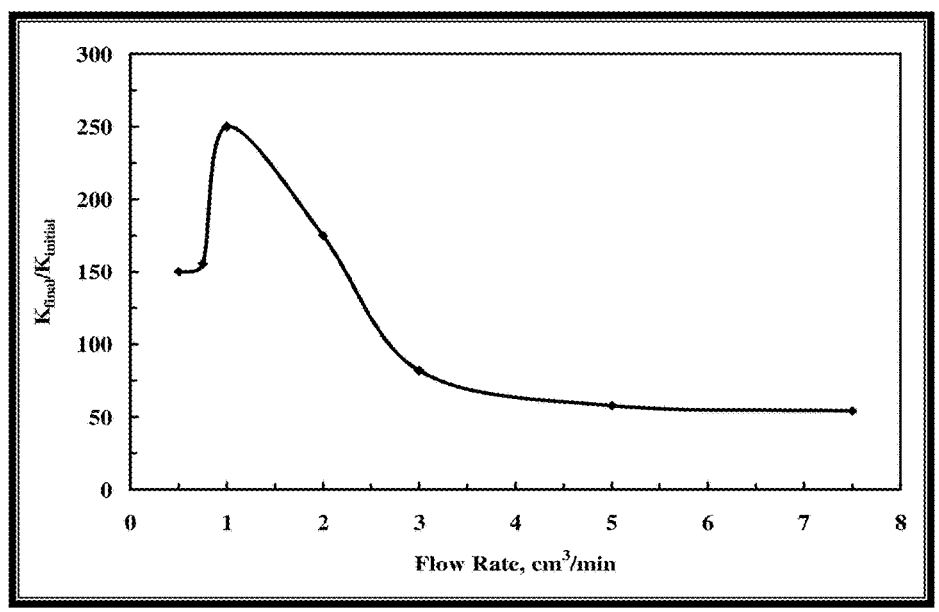
FIG. 41 shows at the optimum rate (1 $cm^3$/min) the permeability was increased from 1 to 250 md.
Figure 42:
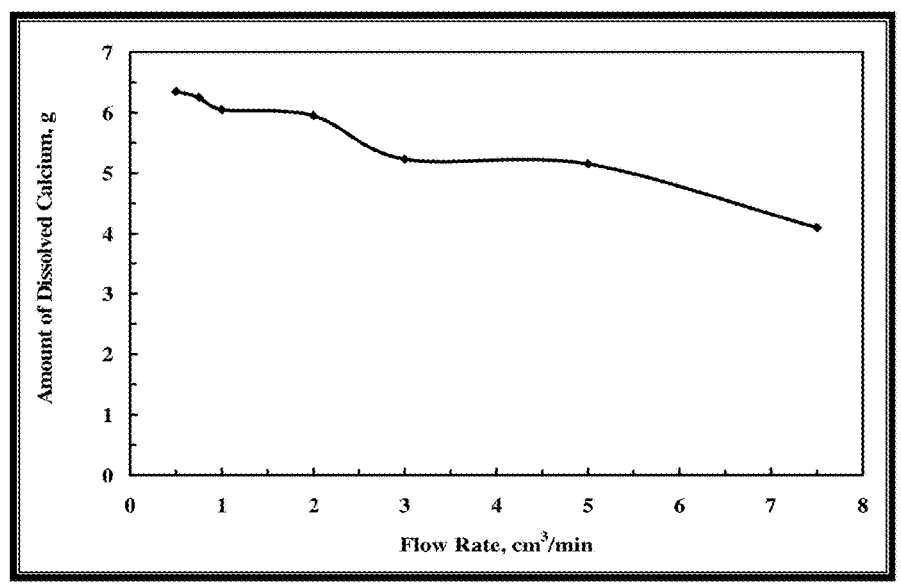
FIG. 42 shows the amount of calcium dissolved was found to be greatest at the lowest rates injected due to the increased contact time and was the least at the highest rate due to the lower contact time.

Example 14—Stimulation of Low Permeability Cores (Indiana Limestone) and Effect of Initial Core Permeability GLDA at 20 wt % and pH values of 1.7 and 3 were used to run the core flood experiments for Indiana limestone. FIGS. 38 and 39 give the data for the core flood experiments that were run at 180° F. FIG. 40 shows the amount of 20 wt % GLDA at pH 1.7 to create wormholes and to breakthrough the core. Also, in this case there was an optimum injection rate at which minimal PVbt were required to create wormholes; this rate was 1 cm$^3$/min. Again, increasing the rate the pore volumes of GLDA required increased due to the decrease in the contact time. Indiana limestone cores had very low initial permeabilities (from 1 to 5 md). Therefore, using the 20 wt % GLDA of pH 1.7 was very effective in creating wormholes and increasing the core permeability. As shown in FIG. 41, at the optimum rate (1 cm$^3$/min) the permeability was increased from 1 to 250 md. The wormholes were uniform and there was no face dissolution observed after the experiments. The amount of calcium dissolved was found to be greatest at the lowest rates injected due to the increased contact time and was the least at the highest rate due to the lower contact time as shown in FIG. 42.

Figure 43:
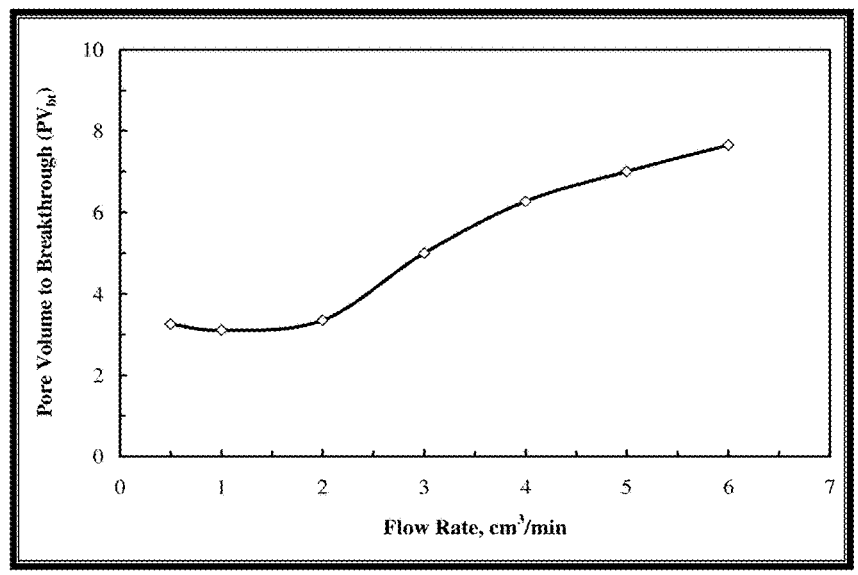
FIG. 43 shows the pore volumes required to breakthrough the core with the 20 wt % GLDA at pH 3 at 180° F.
Figure 44:
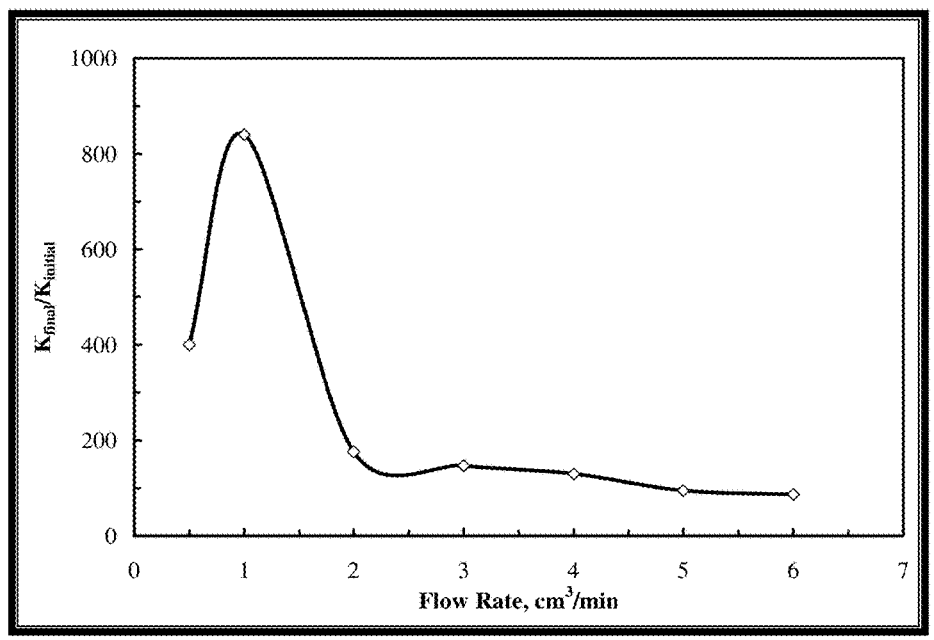
FIG. 44 shows the permeability ratio for the cores before and after the core flood experiment and it reached 840 at the optimum rate.
Figure 45:
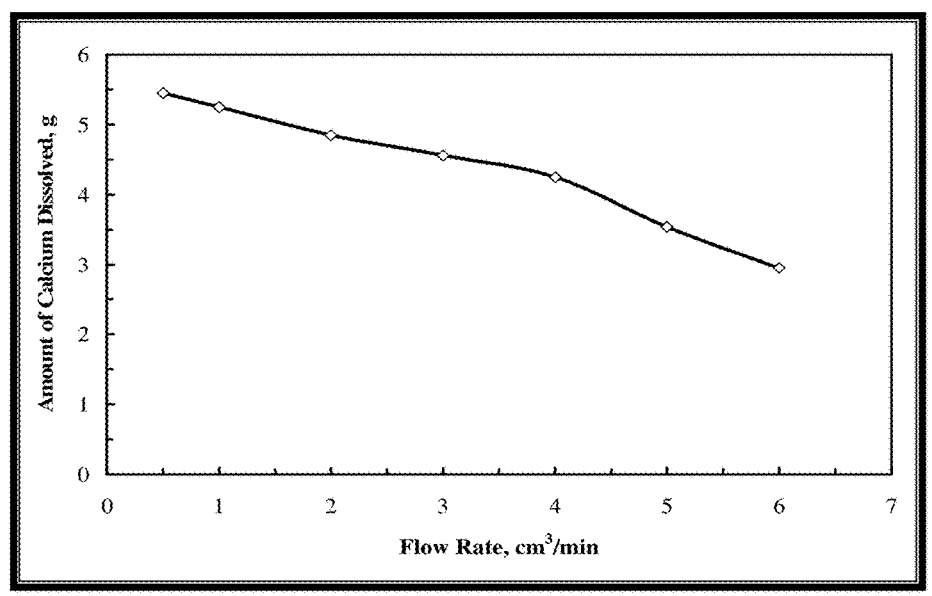
FIG. 45 shows the amount of calcium dissolved was the maximum at the lowest rate.

The same results were obtained with the 20 wt % GLDA at pH 3 and 180° F. FIG. 43 shows the pore volumes required to breakthrough the core with the 20 wt % GLDA at pH 3 at 180° F. As observed at pH 1.7, the optimum flow was found to be 1.0 cm³/min. At this injection rate, the minimum volume of GLDA to create wormholes was found to be 3.11 PV. It was noted that the number of pore volumes to breakthrough the core was slightly higher than that in case of pH 1.7 at the same rate. It was 0.16 PV higher; which can be attributed to the GLDA at pH 1.7 which has more hydrogen ions to attack the rock than the GLDA at pH 3. GLDA at pH 1.7 has a total of four carboxylic groups each in the hydrogen ion form ($H_4GLDA$) compared with GLDA at pH 3 having three hydrogen ions and one sodium ion ($H_3NaGLDA$). FIG. 44 shows the permeability ratio for the cores before and after the core flood experiment and it reached 840 at the optimum rate. This core had a very low permeability before the core flood test, after treating this core with 20 wt % GLDA at pH 3 and 180° F., the permeability was increased from 0.5 md to 420 md. This means that the GLDA at pH 3 was also very effective in dissolving calcite and creating wormholes that increased the core permeability with a ratio of 840. Also, the amount of calcium dissolved was the maximum at the lowest rate as depicted in FIG. 45.

Figure 46:
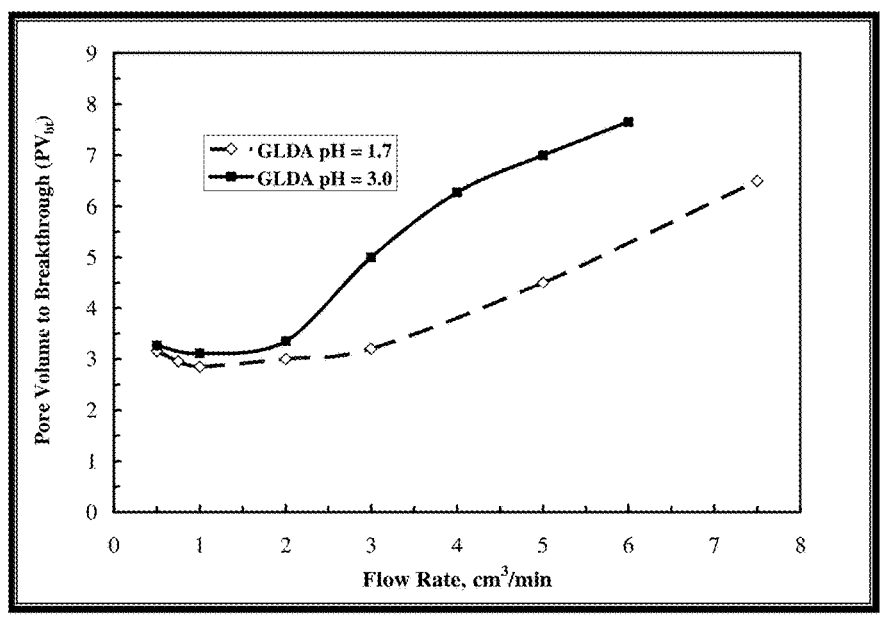
FIG. 46 shows the pore volumes to breakthrough in case of 20 wt % GLDA of pH 1.7 and 3 at 180° F.

FIG. 46 shows the pore volumes to breakthrough in case of 20 wt % GLDA of pH 1.7 and 3 at 180° F. The pore volume to breakthrough for the GLDA of pH 1.7 was very close to that for the GLDA at pH 3 at low rates. As the rate was increased, the difference in pore volumes to breakthrough between the pH 1.7 and pH 3 also increased. At low rates, the contact time played an important role in the reaction of GLDA with calcite, therefore, the difference in pore volumes was small. As the rate increased, the contact time required for the GLDA of pH 3 was much higher than that at pH 1.7. This is because the reaction at pH 1.7 with calcite was faster and thus a fewer number of pore volumes was required to create wormholes. At pH 3 with high injection rates, the pore volumes required for breakthrough were higher to compensate for the decrease in the contact time.

The effect of core permeability was obvious in the amount of calcium dissolved and the pore volumes required to breakthrough in case of high and low core permeability. At the same conditions, the amount of dissolved calcium was greater in case of high permeability cores than with low permeability cores. In turn, the pore volumes required to breakthrough the core was greater in case of high permeability than cores with low permeability. Porosity and permeability was greater in the Pink Desert set of cores than in Indiana limestone set. The optimum flow rate for the lesser permeable Pink Desert cores was 3 cm³/min at which a uniform wormhole was created and a minimum pore volume required to breakthrough. The optimum injection rate for the Indiana limestone cores was less than 2 cm³/min, and the behavior of flow rate and PVbt was different than in case of Pink Desert cores as shown in FIGS. 35 and 40. Increasing the core permeability increased the area-to-volume ratio and the volume of GLDA required to breakthrough the core in the high permeability cores was greater than that required for low permeability cores.

Rock typing which is $(k/\varphi)^{0.5}$ was calculated for each set of cores. It was found that the rock typing was greater in case of Pink Desert set of cores than Indiana limestone set. The higher the rock typing, the higher the dissolved calcium under the same conditions. At 1 cm³/min for a Pink Desert core, the typing factor was 20.85 and the amount of dissolved calcium was 7.53 g, and for an Indiana limestone core with a typing factor of 2.58 the amount of dissolved calcium was 6.05 g.

Example 15—Effect of Core Length on the Volume of GLDA Required to Breakthrough

Core flood experiments were run on long cores to study the effect of core length on the reaction of GLDA with calcite. Two core flood experiments were performed at pH 1.7 at a flow rate of 2 cm³/min at 250° F. The pore volume of the 20 in. core was 95 cm³ and the pore volume of the 6 in. core was 25 cm³. The pore volume of the long core was more than three times the short one. In turn, the contact time of GLDA with the long core will be higher than that with the short core at the same flow rate. The pore volumes required to breakthrough the core in case of the 20 in. core was 2 PV and that for the 6 in. core was 2.45 at the same conditions. The decrease in the number of pore volumes in the long cores was due to the increased contact time. The same scenario was repeated at pH 3, two core flood experiment were performed at a flow rate of 1 cm³/min at 250° F. The pore volumes required to breakthrough the core in case of the 20 in. long core was 1.6 PV and that for the 6 in. core was 2.3. The pore volume of the 20 in. core was also more than three times that of the 6 in. core. This meant that GLDA performed better with the long cores than short cores. The performance of GLDA at pH 3 with 20 in. cores was better than that at pH 1.7. The reduction in pore volumes required 0.7 PV and 0.45 PV at pH 3 and 1.7, respectively. Finally, increasing the core length at any rate will be better for the GLDA to create wormholes and it allowed more time for reaction. GLDA was not degraded during the core flood experiments and its concentration was almost the same after the core flood so it can penetrate deep and can bypass the damage zone if injected for long time.

Example 16—Effect of GLDA Concentration

Figure 48:
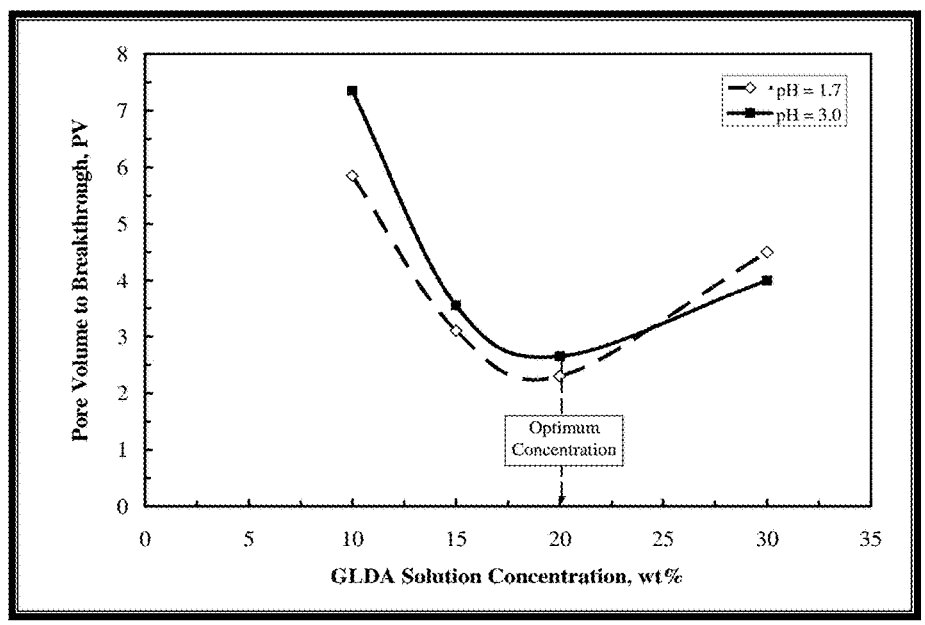
FIG. 48 shows the effect of GLDA solution concentration on the pore volumes of GLDA necessary to breakthrough the core at 2 $cm^3$/min and 250° F.
Figure 49:
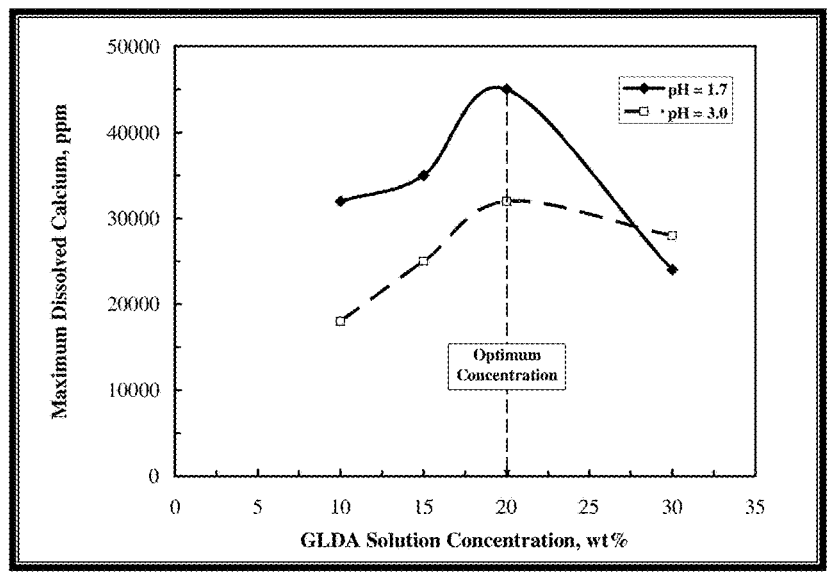
FIG. 49 shows the amount of maximum dissolved calcium in the core flood effluent samples at different concentrations of GLDA solutions.

Various concentrations of GLDA—10, 15, 20, and 30 wt. % were studied at pH 1.7 and 3. FIG. 47 lists the outcome of the core flood experiments performed to study the effect of GLDA concentration on the volume of GLDA required to form wormholes. FIG. 48 shows the effect of GLDA solution concentration on the pore volumes of GLDA necessary to breakthrough the core at 2 cm³/min and 250° F. For higher concentrations, the reaction rate decreased because of the reduced fluid activity caused by the retarding effects of the dissolved reaction products and the increased GLDA viscosity. At 30 wt % GLDA solution concentration, the volume required to breakthrough the core was 3.85 and 4 PV at pH 1.7 and 3, respectively. The lower the concentration, the higher the pore volume required to breakthrough the core. At 10 wt % GLDA solutions, the volume of GLDA required to create wormholes increased to 5.85 and 7.35 PV for pH values of 1.7 and 3, respectively. The optimum concentration at which the lowest volume of GLDA needed to create wormholes was at 20 wt % for both pH values. FIG. 49 shows the amount of maximum dissolved calcium in the core flood effluent samples at different concentrations of GLDA solutions. At a flow rate of 2 cm³/min and 250° F., the maximum dissolved calcium was at 20 wt % concentration indicating that this is the optimum concentration that should be used to get the highest rate of calcite dissolution. At concentrations greater or less than 20 wt % GLDA, the dissolution process was less effective. From FIG. 49, the reaction of GLDA at pH 3 with calcite was not reduced by the same magnitude as it was at pH 1.7. GLDA at pH 1.7 resulted in more calcium dissolved which then increased the fluid's viscosity and thus likely retarded the reaction more than GLDA at pH 3 which has low dissolution ability.

Example 17—Effect of Temperature on Optimum Injection Rate

Figure 50:
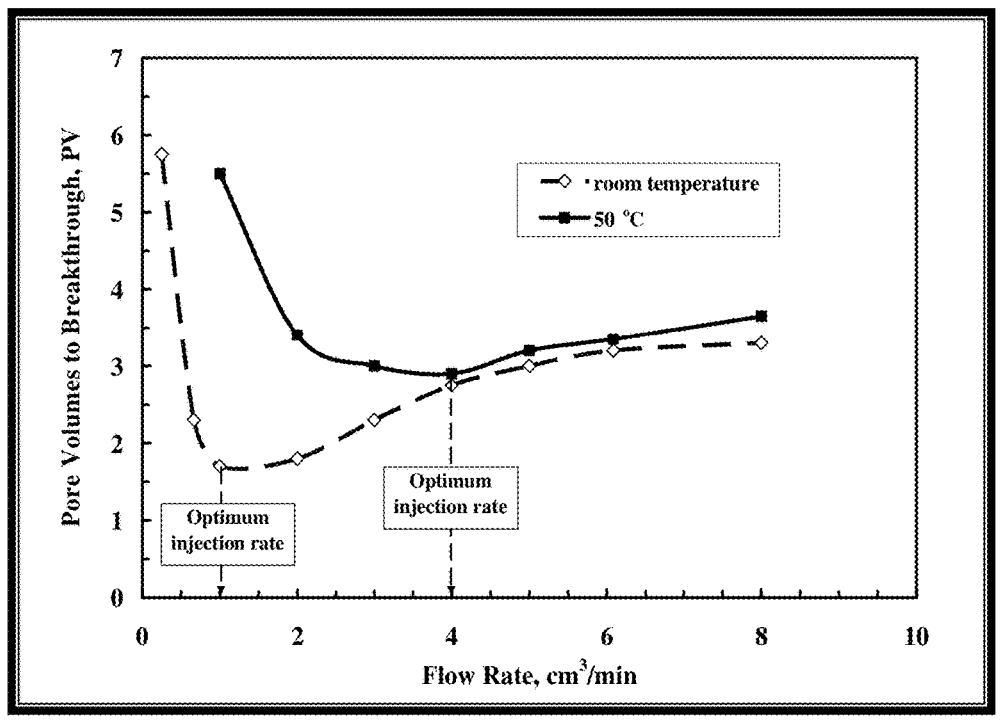
FIG. 50 shows that increasing temperature from 72 to 122° F. increased the optimum injection rate from 1 to 3.5 $cm^3$/min for 3.4 wt % HCl.

Previous studies investigated the effect of increasing temperature on the optimum injection rate of HCl acid with carbonate. It was found that increasing the temperature increased the optimum injection rate required to form wormholes. The higher the reservoir temperature, the higher the optimal injection rate of HCl, and it sometimes was beyond the maximum injection allowed which is the rate to avoid fracturing the formation. Increasing temperature from 72 to 122° F. increased the optimum injection rate from 1 to 3.5 $cm^3$/min for 3.4 wt % HCl, FIG. 50. At higher temperatures and higher HCl concentrations, it was predicted that the optimum injection rate will exceed the maximum possible injection rate. Increasing temperature increased the volume of HCl required to breakthrough the core. At 1 $cm^3$/min, the volume of HCl increased from 1.6 PV at room temperature to 5.5 PV at 122° F.

Figure 51:
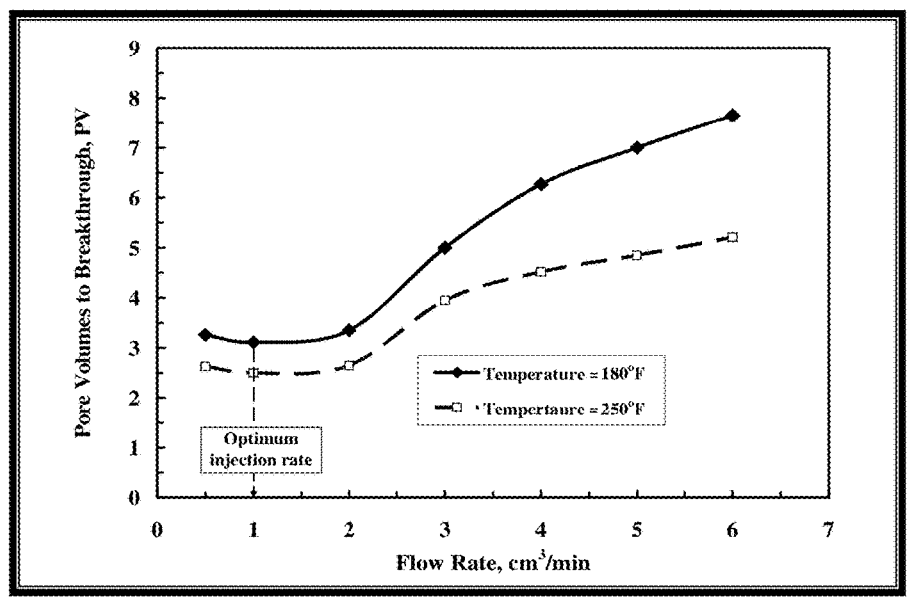
FIG. 51 shows the effect of increasing temperature on the optimum injection rate for 20 wt % GLDA solution at pH 3.

FIG. 51 shows the effect of increasing temperature on the optimum injection rate for 20 wt % GLDA solution at pH 3. Increasing temperature from 180 to 250° F. decreased the GLDA pore volumes required to create wormhole and did not shift the curve to the left or right as did HCl. Increasing temperature enhanced the reaction of GLDA with calcite at different injection rates and the optimum injection rate was at the same range. Increasing temperature enhanced the performance of GLDA and did not change the optimum injection rate required as found with HCl. Thus, there is less of an effect of increasing the temperature on the optimal injection rate of GLDA. In stark contrast to HCl, increasing temperature actually decreased the volume of GLDA fluid required to breakthrough the core. At 1 $cm^3$/min, the volume of GLDA decreased from 3.11 PV at 180° F. to 2.5 PV at 250° F. for the Indiana limestone cores treated with 20 wt % GLDA solutions at pH 3. Increasing the temperature enhanced the performance of GLDA and diminished the performance of HCl with calcite.

Example 18—Comparing GLDA With HCl and Other Chelates

Figure 52:
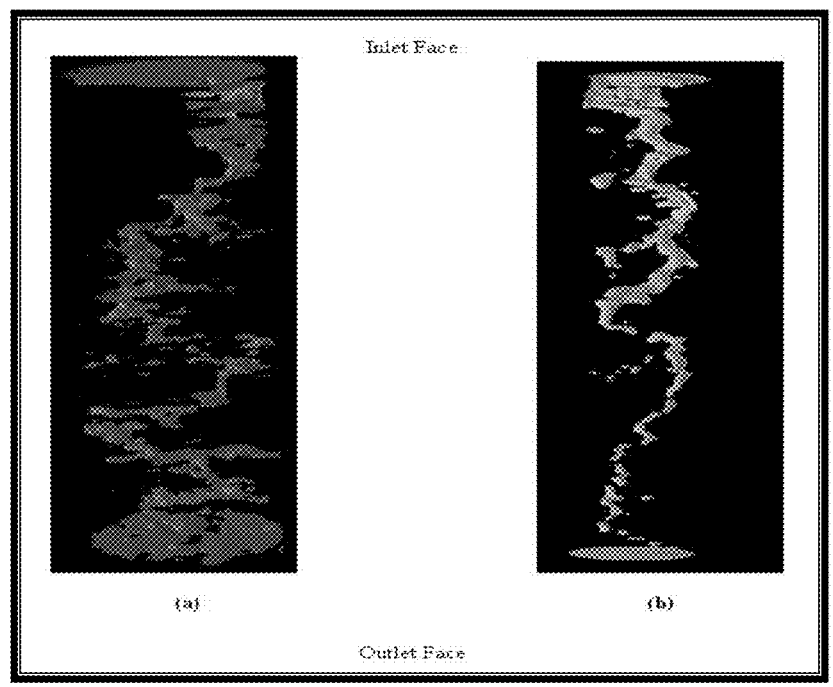
FIG. 52 shows a comparison between the wormhole for a calcite cores treated by 15 wt. % HCl and 20 wt. % GLDA at pH 1.7.

The 16 wt % GLDA at pH 3 was compared with other chelates, such as 20 wt % HEDTA at pH 4 and 20 wt % HEDTA at pH 2.5 at 2 $cm^3$/min and 250° F. The pore volumes required to breakthrough the calcite cores at these conditions were 3.3, 7.5, and 11 PV for the 16 wt % GLDA at pH 3, 20 wt % HEDTA at pH 4 and 20 wt % HEDTA at pH 2.5, respectively. Therefore, the GLDA performance was better than HEDTA. The problem with HEDTA there is its low biodegradability while GLDA is readily biodegradable. FIG. 52 shows a comparison between the wormhole for a calcite cores treated by 15 wt. % HCl and 20 wt. % GLDA at pH 1.7. The core flood experiments were both performed at 2 $cm^3$/min. The 20 wt. % GLDA was tested at 200° F. while the 15% HCl was tested at room temperature. There was no face dissolution in the core that was treated by GLDA and the wormhole was uniform but the washout is clearly shown in the case of 15 wt % HCl even when injected at room temperature. The wormhole shape was not uniform in case of 15 wt % HCl and the width of the wormhole decreased to one quarter of its original width. The width of wormhole was almost the same from the core inlet to the core outlet in case of 20 wt % GLDA. The pore volumes required to breakthrough the core were 1.8 and 2.1 in case of 15 wt % HCl at room temperature and 20 wt % GLDA solutions at 200° F., respectively.

Example 19—Optimum Injection Rate for Different pH Values (6-in. Cores)

Two new cores were used in each experiment, the cores permeabilities were measured first using de-ionized water. The experiments were run at different flow rates and 200° F. GLDA solutions with a concentration of 20 wt % at pH 3.8 were used in all experiments. The collected samples from the coreflood effluent were analyzed for flow rate by dividing the collected volume from the effluent for each core by the time, and total calcium concentration using the atomic absorption (AAnalyst 700). The injection of GLDA solutions continued until the wormholes breakthrough the two cores.

The optimum injection rate for different stimulation fluids has been determined by many previous investigators. The importance of identifying the optimum injection rate is to achieve the maximum penetration of the stimulation fluid through the treated zone. The volume of the stimulation fluid required to create deep, uniform wormholes is minimum at the optimum injection rate, therefore, it is necessary to determine the optimum injection rate for each stimulation fluid.

The optimum injection rate for 0.5M HCl was found to be 1 $cm^3$/min and the pore volumes required to breakthrough the core was 0.9 PV. For injection rates greater than the optimum, the PVbt increased to 2.5 PV at 10 $cm^3$/min. At injection rates less than the optimum, the PVbt reached 100 PV at 0.1 $cm^3$/min. Similar trends were obtained by others for 10 wt % acetic acid and 10 wt % LCA (long chained carboxylic acid). The results for HCl, acetic acid, and long chained carboxylic acid showed that at rates greater than the optimum, the increase in PVbt was small. At injection rates less than the optimum, the increase in PVbt was very high. GLDA exhibited an optimum injection rate at different pH values. Unlike HCl and acetic acid, increasing the injection rate above the optimum the PVbt increased more than that when decreasing the injection rate below the optimum one. This performance of PVbt with injection rate was observed by others. The performance of chelating agents (EDTA, and DTPA) was different than HCl in the relation between PVbt and injection rate.

Figure 53:
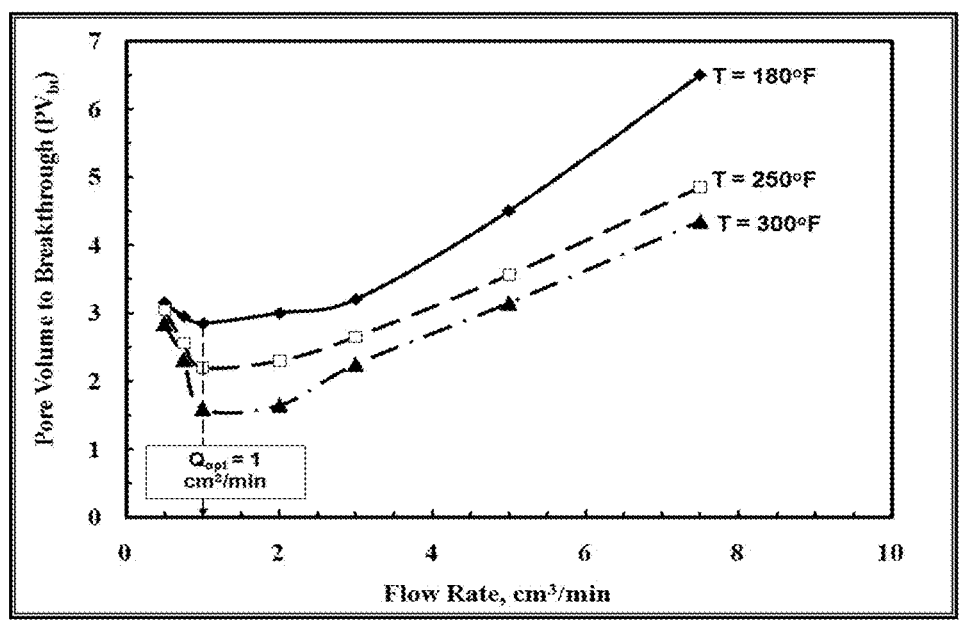
FIG. 53 shows the optimum injection rate for 20 wt % GLDA at pH 1.7 at different temperatures for Indiana limestone cores at 1 $cm^3$/min.

FIG. 53 shows the optimum injection rate for 20 wt % GLDA at pH 1.7 at different temperatures for Indiana limestone cores at 1 $cm^3$/min. The pore volume at breakthrough (PVbt) at the optimum rate was 2.85 PV at 180° F., at injection rates below the optimum, for example at 0.5 $cm^3$/min, the PVbt was 3.15 PV at the same temperature. At injection rates greater than the optimum, for example at 7.5 $cm^3$/min, the PVbt was 6.5 PV. Similar trend was obtained for EDTA by others. The optimum injection rate of 1 $cm^3$/min for GLDA at pH 1.7 allows the use of GLDA in low fracture pressure formations where HCl cannot be used. The trend for GLDA was different from that for HCl, at low injection rates HCl caused face dissolution and required higher volumes to create wormholes. GLDA when injected at low rates did not require this large pore volume as HCl did, but it required small pore volume. Low injection rate in case of GLDA allowed more time for reaction and dissolved larger amount of calcium than at high injection rates.

The optimum injection rate was identified by others for 15 wt % HCl to be 20 cm³/min for 20-in. calcite cores. HCl should be injected at the maximum injection rate to give deep penetration and create uniform wormholes, but this will not be attained in reservoirs with low fracture pressure. GLDA has the benefit over HCl in that decreasing the rate below the optimum rate, for example at 0.5 cm³/min, did not create face dissolution as HCl did, but it consumed 0.3 PV more fluid than that at the optimum rate.

Figure 54:
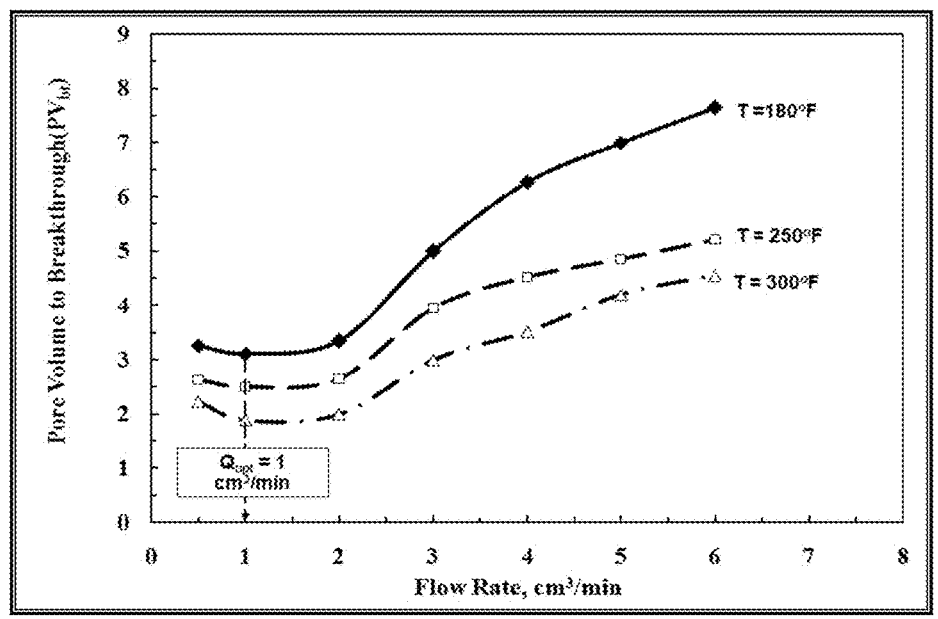
FIG. 54 shows the optimum injection rate for 20 wt % GLDA solutions at pH 3.

FIG. 54 shows the optimum injection rate for 20 wt % GLDA solutions at pH 3. The optimum injection rate is not clearly obvious for GLDA at pH 1.7. A range from 0.5 to 2 cm³/min existed for the optimum injection rate because the difference in PVbt was small at the three rates 0.5, 1 and 2 cm³/min. The pore volumes to breakthrough were 3.26, 3.11, and 3.35 PV at 0.5, 1, and 2 cm³/min respectively. Although the difference was small in this range, the minimum was at 1 cm³/min, so we can conclude that for the 20 wt % GLDA at pH 3, the optimum injection rate ranged from 0.5 to 2 cm³/min.

Figure 55:
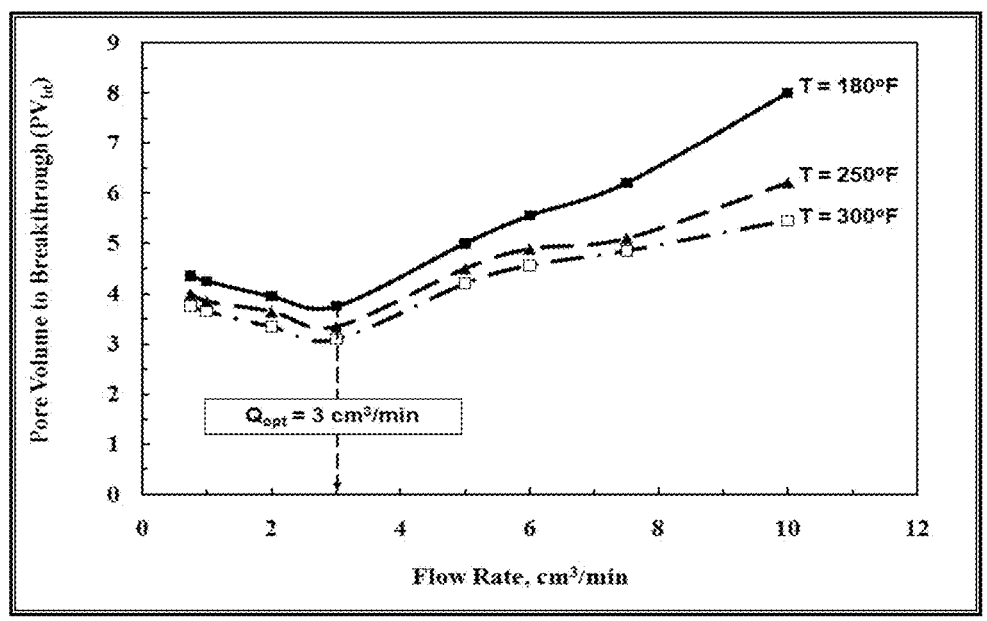
FIG. 55 shows the optimum injection rate for Pink Desert calcite cores using 20 wt % GLDA at pH 1.7 at 180, 250, and 300° F.

FIG. 55 shows the optimum injection rate for Pink Desert calcite cores using 20 wt % GLDA at pH 1.7 at 180, 250, and 300° F. An optimum injection rate existed at each temperature, and it was constant at 3 cm³/min. The optimum injection rate for Pink Desert was greater than that for Indiana limestone cores at the same conditions. The increase in optimum injection rate for the Pink Desert high permeability cores was attributed to the increase in area-to-volume ratio. In turn, more GLDA was required to form wormholes at the same conditions. More calcium was dissolved in the high permeability cores; therefore more pore volumes were required to create wormholes. The pore volume to breakthrough in case of Pink Desert cores was higher than that for Indian limestone cores at the optimum injection rate.

Example 20—Optimum Injection Rate for GLDA at pH 3 (20-in. Cores)

Investigating the effect of core length on the optimum injection rate is important, because when we inject the fluid in the formation we need the maximum penetration for this fluid to bypass the damaged zone. All the work done in calcite stimulation by HCl, EDTA, and acetic acid was done on short cores (5 in. maximum).

Figure 56:
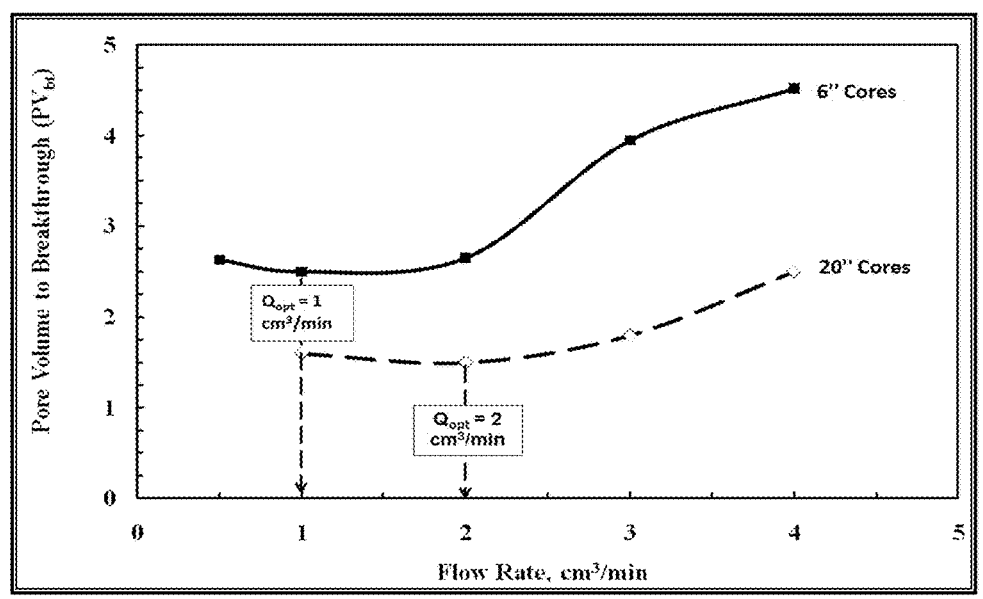
FIG. 56 shows the optimum injection rate for 20 in. and 6-in. Indiana limestone cores treated by 20 wt % GLDA at pH 3 and 250° F.

FIG. 56 shows the optimum injection rate for 20 in. and 6-in. Indiana limestone cores treated by 20 wt % GLDA at pH 3 and 250° F. The 20-in. cores gave a trend similar to the 6-in. cores, but in this case the optimum injection rate was 2 cm³/min. The optimum injection rate for the 20-in. Indiana limestone cores was greater than for 6-in. Indiana limestone cores because the increased contact time. For the 20-in. core length, the average pore volume was 70 cm³ and the average pore volume for the 6-in. cores was 20 cm³. The pore volume of the long cores was more than three times that of the short cores, so the contact time for GLDA with calcite was higher in the long cores than in the short cores. Increasing the contact time in case of long cores allowed GLDA to dissolve more calcium than that in short cores. Moreover, the volume of the fluid required to penetrate through the core and form wormholes was less in case of the 20-in. cores compared to the 6-in. cores. At a flow rate of 2 cm³/min, the volume of GLDA to breakthrough the core was 1.6 PV in the 20-in. core, and 2.65 PV in the 6-in. core. Therefore, soaking GLDA through the damaged zone will dissolve more calcium and minimize the volume required to bypass the damage.

Example 21—Effect of Temperature on the Optimum Injection Rate at Different pH Values The demand for oil nowadays led the oil industry companies to drill deep wells to find oil and gas. Deep oil and gas wells mean high temperatures. It is important to investigate the effect of temperature on the performance of the stimulation fluid when injected at high temperature. The injection rate should be adjusted according to the temperature of the formation.

FIGS. 53 to 55 show the optimum injection rate at different pH values and at different temperatures. Increasing the temperature from 180 to 300° F. did not affect the optimum injection rate at different pH values. The optimum injection rate remained the same but increasing the temperature increased the reaction rate and reduced the pore volume required to break through the core. Increasing the temperature during stimulation of calcite cores by HCl increased the optimum injection rate. Increasing the temperature from 72 to 122° F. increased the optimum injection rate for 3.4 wt % HCl from 1 to 4 cm³/min. The optimum injection rate for EDTA increased by increasing the temperature from 72 to 175° F., but the pore volumes to breakthrough decreased by increasing the temperature. Increasing the temperature from 180 to 300° F. decreased the pore volumes required to form wormholes from 2.85 to 1.6 cm³/min for Indiana limestone cores and the optimum rate did not change from 1 cm³/min. The same scenario was repeated at pH 3 as shown in FIG. 54. Increasing the temperature at pH 3 enhanced the reaction of GLDA with calcite and decreased the pore volumes required to breakthrough the core. FIG. 55 shows the optimum injection rate at different temperature, the increase in temperature did not change the optimum injection rate for Pink Desert cores, which remained fixed at 3 cm³/min. Increasing temperature decreased the pore volumes to breakthrough at 3 cm³/min from 3.75 to 3.1 cm³/min. The decrease in pore volumes to breakthrough by increasing temperature was higher in case of Indiana limestone than Pink Desert cores. This can be attributed to the high area-to-volume ratio in Pink Desert cores because the high permeability. Increasing temperature enhanced the reaction of GLDA with Pink Desert cores but not at the same rate in case of Indiana limestone cores. Unlike HCl, GLDA at different pH values has a fixed optimum injection rate, and this rate was not affected by increasing the temperature up to 300° F.

Example 22—Calculation of Damköhler Number

The creation of wormholes in calcite cores using HCl, EDTA, and acetic acid was found to be dependent on the Damköhler number. There was a strong function between the fluid volume required to create wormholes and the Damköhler number.

Figure 57:
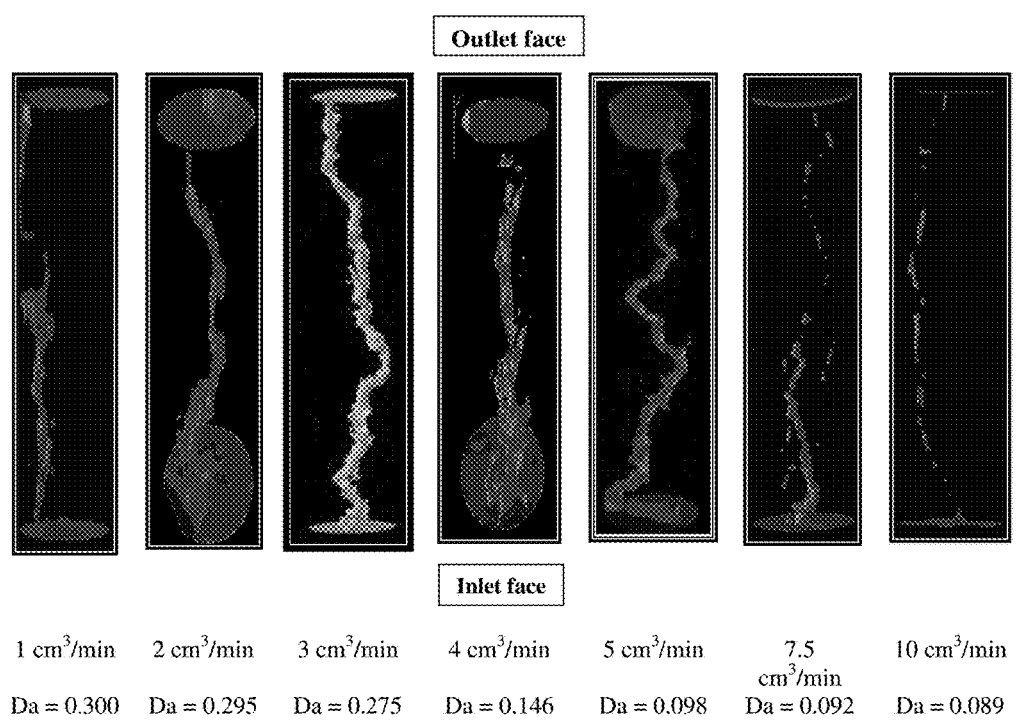
FIG. 57 shows the 3D wormhole images for the pink desert cores that were treated by 20 wt % GLDA solution of pH=1.7.
Figure 58:
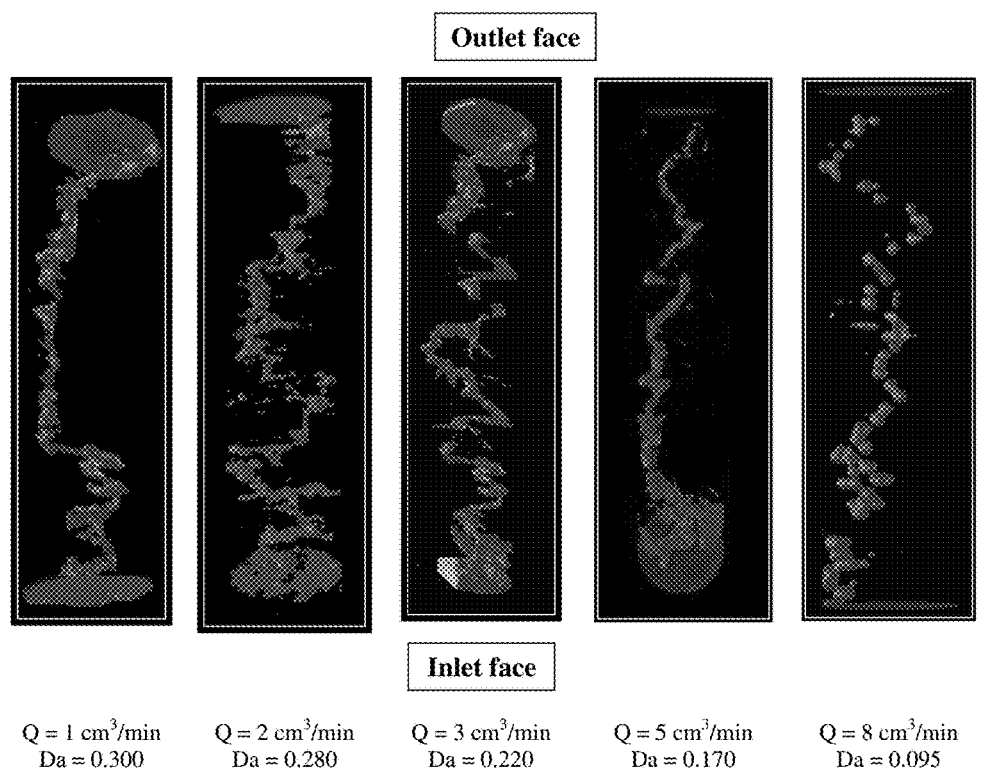
FIG. 58 shows the 3D wormhole images for long calcite cores (20 in.).

The Damköhler number was calculated based on the final wormhole dimensions. The average wormhole diameter was measured from the CT scan. FIG. 57 shows the 3D wormhole images for the pink desert cores that were treated by 20 wt % GLDA solution of pH=1.7. The Damköhler numbers for the different flow rates were calculated. The same was done for long calcite cores (20 in.), the Damköhler number was calculated based on the diameter from the CT 3D images for the 20-in. cores, FIG. 58. The optimum Damköhler number for Pink Desert cores was 0.275 at 3 cm³/min and 0.280 for the 20-in. Indiana limestone cores. At this rate, the pore volumes required to breakthrough the core and create wormhole was the minimum. To scale this optimum injection rate to the field with a formation thickness of 100 ft and 0.328 ft wellbore radius, the optimum injection rate will be about 0.5 bbl/min. The optimum injection rate can be predetermined from the optimum Damköhler number by first calculating the optimum injection velocity. The optimum injection rate can also be determined.

Figure 59:
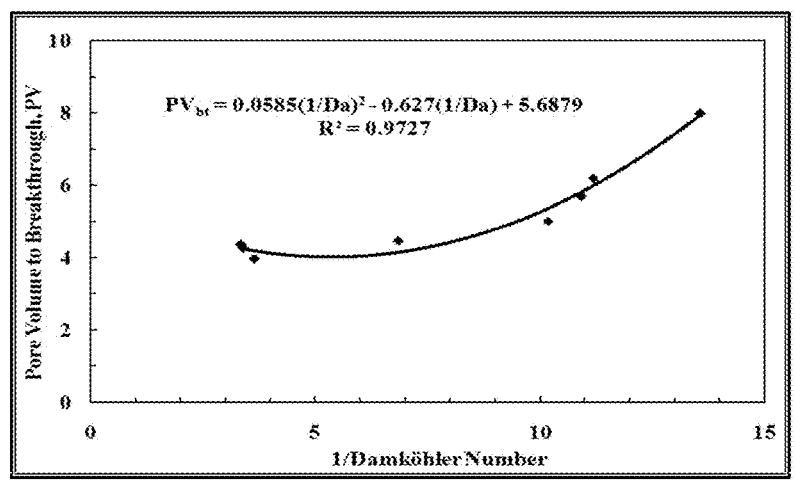
FIG. 59 shows the dependence of the wormhole structure on the Damköhler number.

FIG. 59 shows the dependence of the wormhole structure on the Damköhler number. The number of pore volume to breakthrough was plotted versus 1/Damköhler number for 20 wt % GLDA of pH 1.7 at 180° F. The relation between the pore volume to breakthrough and the Damköhler number was a weak relationship. It was not strong as in case of HCl, EDTA, and acetic acid. The pore volume to breakthrough increased from 4 to 8 PV only as the Damköhler number was decreased from 0.3 (1/Da=3.33) to 0.07 (1/Da=14). There was a similar trend like the flow rate with pore volume in this case, FIG. 55. Increasing the Damköhler number means high dissolution rate and low pore volumes required to breakthrough the core. For the 6 in. core length and 1.5 in. diameter, the optimum injection velocity was 3.8×10-3 cm/s and the optimum injection rate was 2.6 cm³/min. The optimum injection velocity and optimum injection rate were calculated respectively using an optimum Damköhler number of 0.29.

Figure 60:
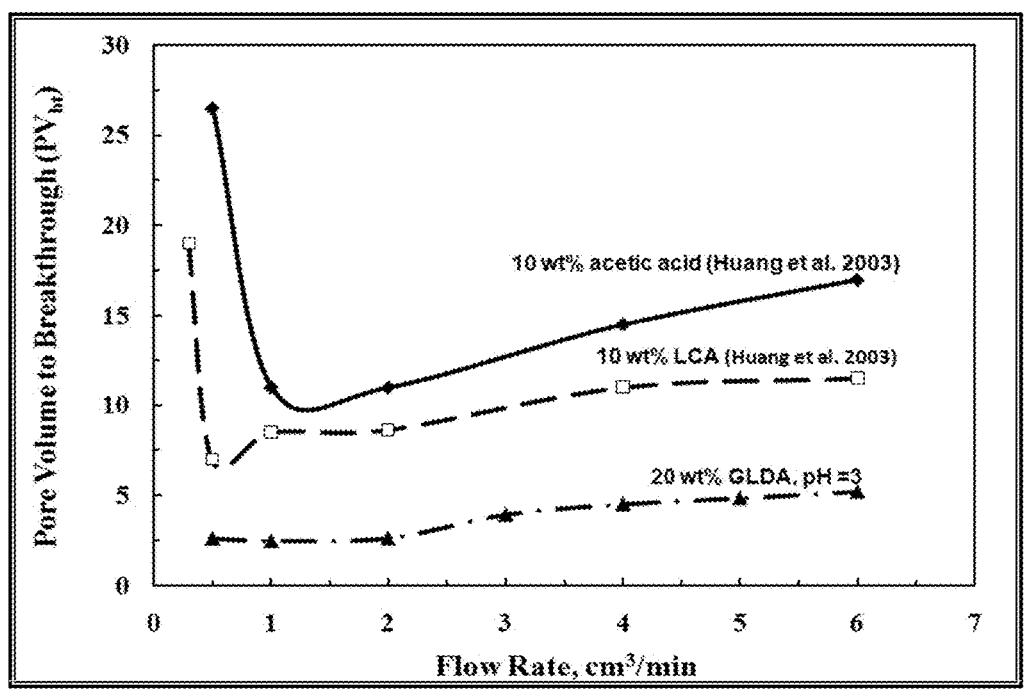
FIG. 60 shows a comparison between 20 wt % GLDA at pH 3 and 10 wt % long chain carboxylic acid (LCA), 10 wt % acetic acid at 250° F.

Example 23—Pore Volumes to Breakthrough for Different Chelating Agents, Acetic Acid, and HCl FIG. 60 shows a comparison between 20 wt % GLDA at pH 3 and 10 wt % long chain carboxylic acid (LCA), 10 wt % acetic acid at 250° F. GLDA outperformed LCA and acetic acid, as the pore volumes to breakthrough was lower than that for LCA and acetic acid. Decreasing the flow rate increased the pore volumes required to breakthrough the core in both LCA and acetic acid and did not affect GLDA. In addition, 0.6M Na₄GLDA was compared with 0.6M Na₄EDTA at a flow rate of 2 cm³/min and 250° F. The pore volumes required to breakthrough the core for 0.6M Na₄EDTA and 0.6M Na₄GLDA were 24 and 14 PV, respectively. GLDA at higher pH (13) performed better than EDTA as it required 10 PV less than that for EDTA to breakthrough the core. EDTA exhibited the same wormhole structure as HCl, at low injection rates there was face dissolution.

Figure 61:
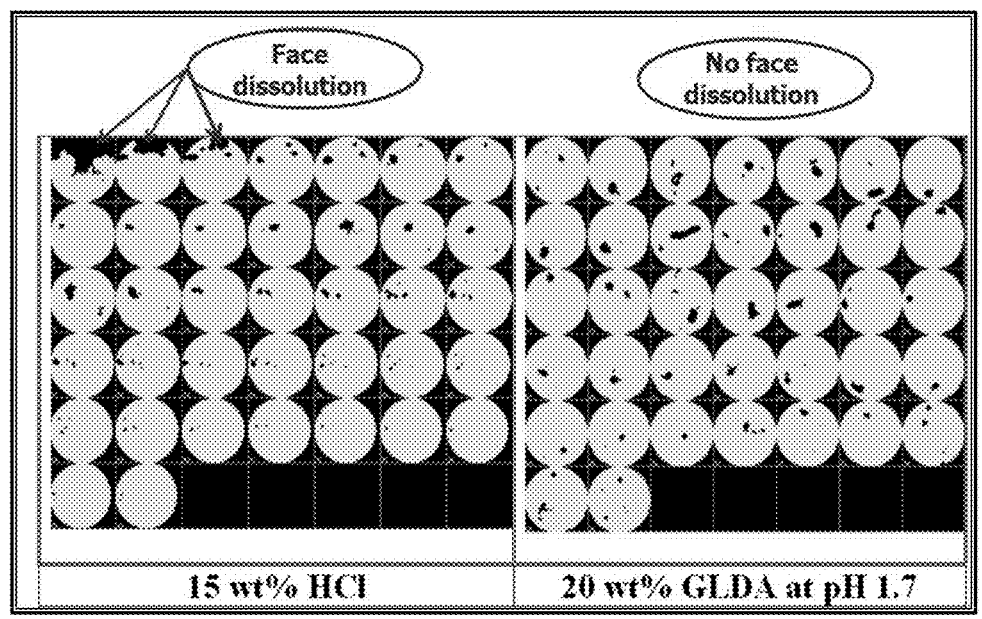
FIG. 61 shows the 2D CT scan images for the 6-in. pink desert calcite cores treated by 15 wt % HCl and 20 wt % GLDA at pH 1.7 at 200° F. and a flow rate of 1 $cm^3$/min.

FIG. 61 shows the 2D CT scan images for the 6-in. pink desert calcite cores treated by 15 wt % HCl and 20 wt % GLDA at pH 1.7 at 200° F. and a flow rate of 1 cm³/min. Face dissolution was obvious in case the 15 wt % HCl but there was no face dissolution in the case of 20 wt % GLDA. The core initial permeability was 55 md in case of HCl coreflood and it was 58 md in case of GLDA. The wormhole diameter decreased in case of 15 wt % HCl as the wormhole penetrated through the core. The wormhole in the case of 20 wt % GLDA almost had a constant diameter through the entire core length.

Figure 62:
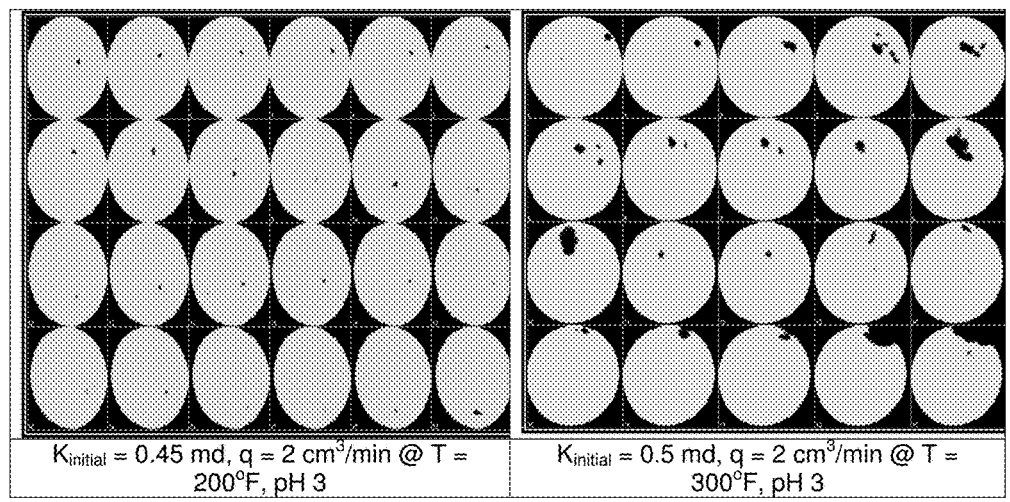
FIG. 62 shows the effect of temperature on the wormhole size at a flow rate of 2 cm$^3$/min and at pH 3.

Example 24—Effect of Temperature, Flow Rate, Permeability, and pH on the Wormhole Shape and Size FIG. 62 shows the effect of temperature on the wormhole size at a flow rate of 2 cm³/min and at pH 3. The permeabilities of the two cores are close in values at 0.45 and 0.5 md. As the temperature was increased from 200 to 300° F., the wormhole size increased. The wormhole size at 200° F. was less than 1.5 mm but it reached more than 5 mm at 300° F. Increasing the temperature by 100° F. increased the wormhole size more than three times, indicating the effectiveness of GLDA in creating large wormholes at high temperatures. At 200° F., the wormholes were almost uniform circles; as the temperature was increased to 300° F., the shape of wormholes started to change from circular to irregular shapes and more than one wormhole was formed. At 300° F., GLDA reacted with the rock vigoursly and created many wormholes.

Figure 63:
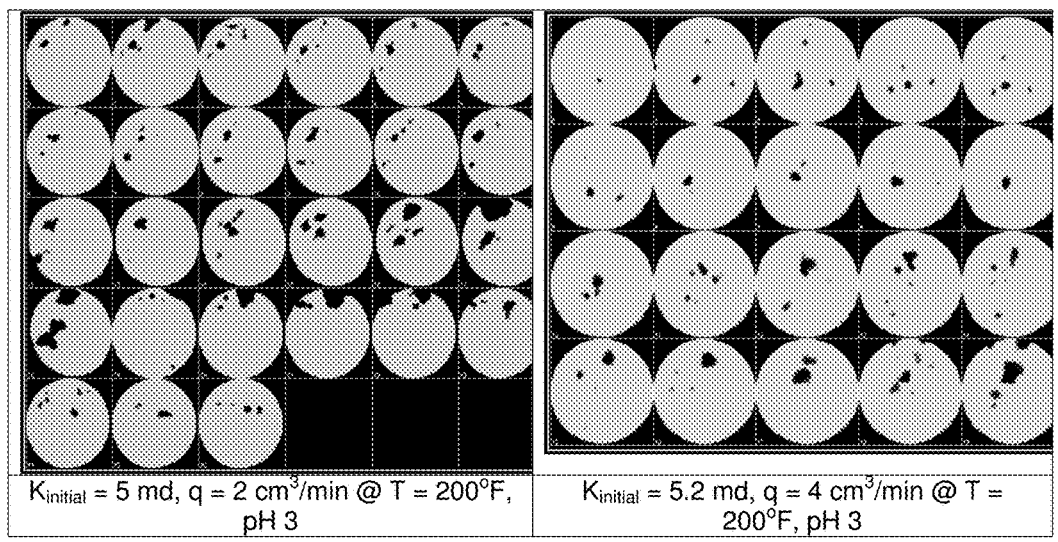
FIG. 63 shows the effect of flow rate on the wormhole size.

FIG. 63 shows the effect of flow rate on the wormhole size. Fixing other parameters like permeability and temperature, the effect of flow rate on the wormholes shape and size was studied. At 2 cm³/min, the wormholes formed by 20 wt % GLDA at pH 3 were bigger than that at 4 cm³/min. Increasing the flow rate from 2 to 4 cm³/min decreased the contact time between GLDA and calcite and in turn reduced the reaction rate. At 2 cm³/min injection rate, more than one wormhole with irregular shape was formed. At 4 cm³/min the wormholes started to take regular rounded shapes but smaller sizes than that at 2 cm³/min.

Figure 64:
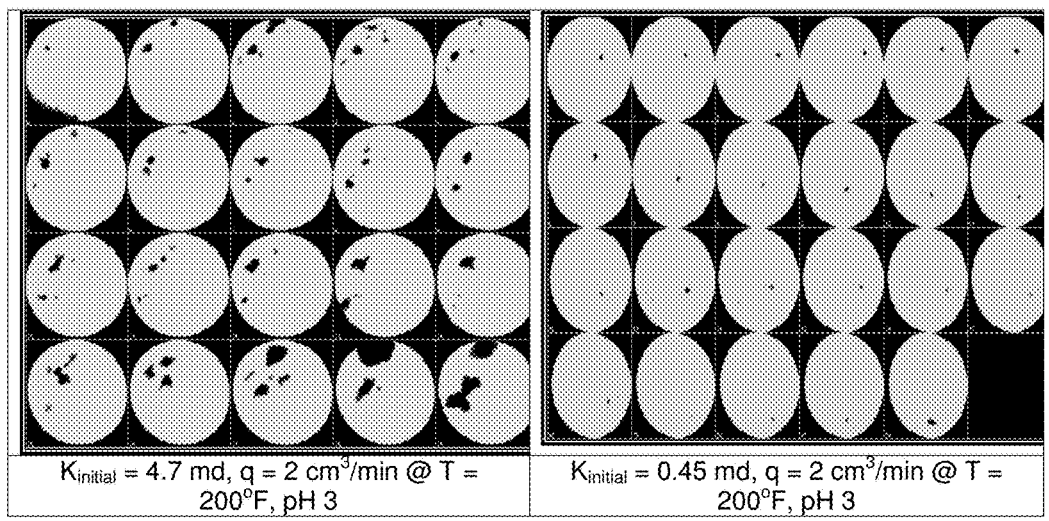
FIG. 64 shows the effect of permeability on the wormhole size.

FIG. 64 shows the effect of permeability on the wormhole size. Two cores with permeabilities of 0.45 and 4.7 md were selected at 2 cm³/min and 200° F. using 20 wt % GLDA at pH 3. The wormhole size of the high permeability core (4.7 md) was bigger than that of the low permeability core (0.45 md) at the same conditions. As the core permeability increased, the area to-volume ratio increased and the surface area exposed to the reaction increased. In turn, bigger wormholes were formed at high permeability than at low permeability. Increasing the core permeability also increased the amount of GLDA required to form wormholes at the same conditions. The pore volumes required to form the smaller size wormholes in the low permeability core (0.45 md) at 2 cm³/min and 200° F. were 2.65 PV. The pore volumes to create bigger wormholes in case of the high permeability core (4.7 md) were 3.35 PV at the same conditions.

Figure 65:
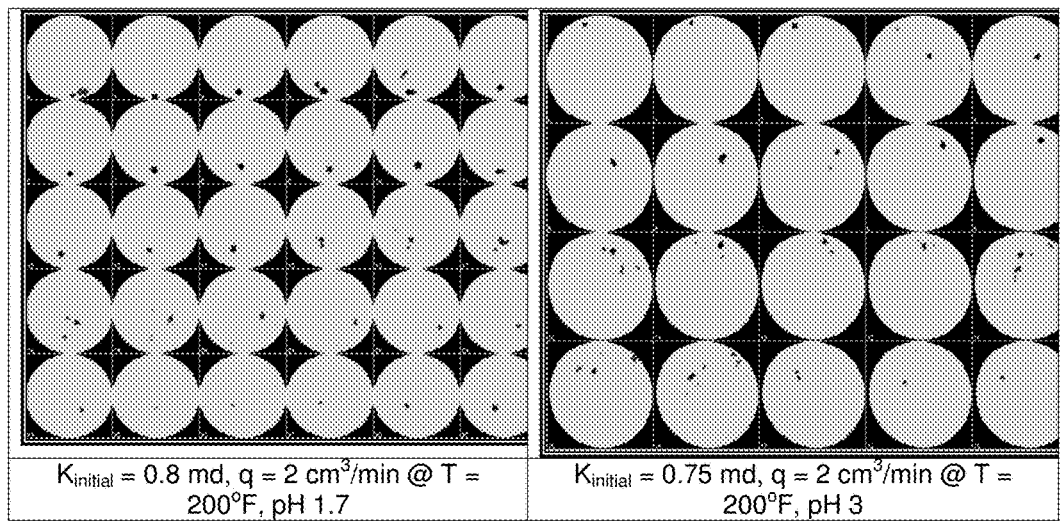
FIG. 65 shows the effect of GLDA pH on the wormhole size.

FIG. 65 shows the effect of GLDA pH on the wormhole size. The chemical reaction of GLDA was investigated with calcite at different pH values. At low pH (1.7), the reaction of GLDA with calcite was attributed to the hydrogen ion attack and at higher pH (13) the reaction was complexation only. A minor difference between the wormhole sizes in 1.7 and 3 pH values was noticed. At pH of 3, GLDA has 3 hydrogen ions in the carboxylic groups and it has also hydrogen attack. Increasing GLDA pH from 1.7 to 3 did not create noticeable changes in the wormhole shape and size. Extra pore volume of 0.1 PV was required to create the wormhole at pH 3. The pore volumes to breakthrough at 2 cm³/min and 200° F. in case of GLDA at pH 3 was 3.55 PV and was 3.45 PV at pH 1.7 at the same conditions.

Example 25—Effect of NaCl on the Performance of GLDA During Coreflood

Figure 66:
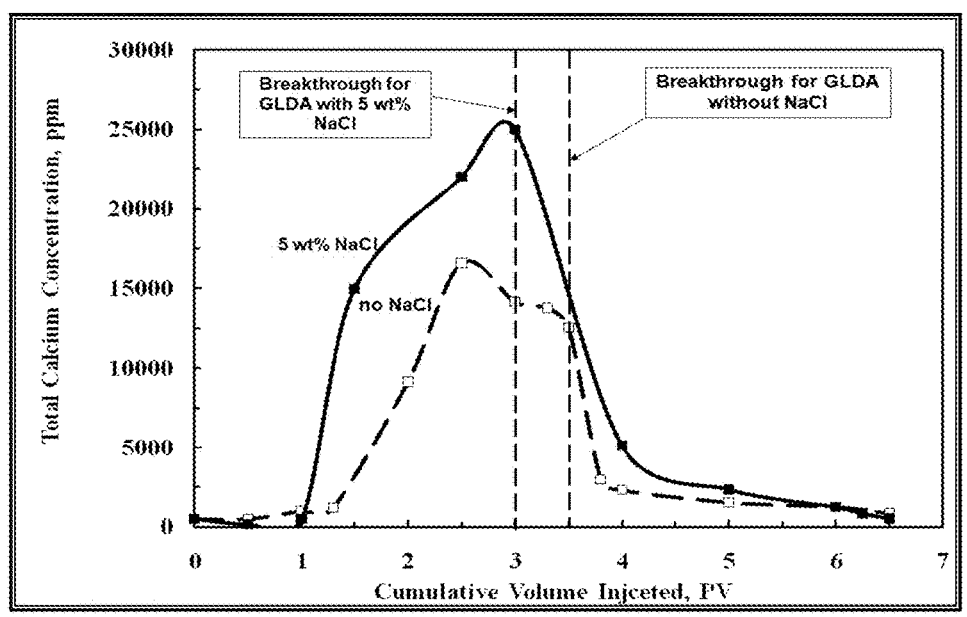
FIG. 66 shows the total calcium concentration for the two coreflood experiments.

GLDA solutions were prepared containing different concentration of sodium chloride. GLDA solutions with a concentration of 20 wt % at pH 3.8 were used and NaCl concentration of 5 wt % was used. Two coreflood experiments were performed using the prepared solutions at a flow rate of 2 cm³/min and 300° F. FIG. 66 shows the total calcium concentration for the two coreflood experiments. The wormhole broke through the core at 3 PV and 3.5 PV for 20 wt % GLDA without NaCl and with 5 wt % NaCl respectively. Adding 5 wt % NaCl enhanced the performance of GLDA and saved 0.5 PV. The calcium concentration reached a maximum of 25,000 ppm in case of GLDA with 5 wt % NaCl, and 17,000 ppm in case of GLDA without NaCl. The presence of sodium chloride enhanced the thermal stability of the GLDA at 300° F.

Figure 67:
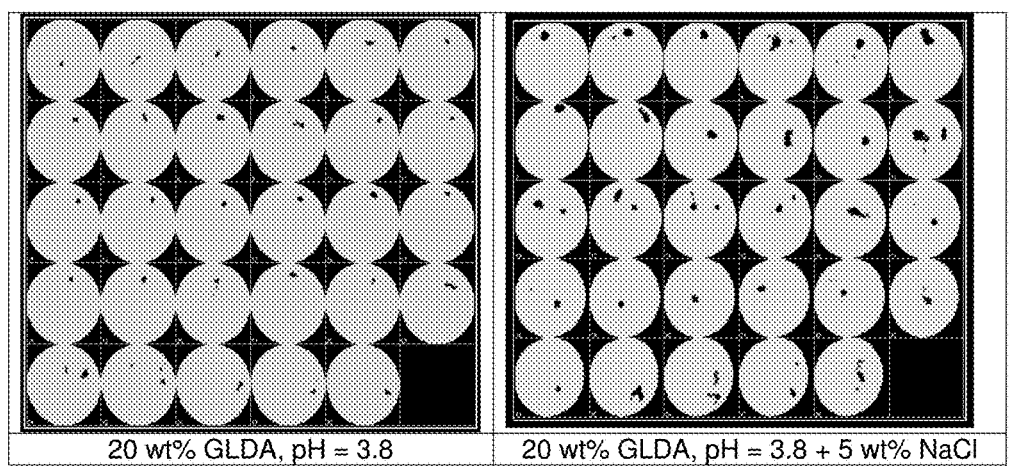
FIG. 67 shows the effect of adding 5 wt % NaCl on the wormhole shape and size.

FIG. 67 shows the effect of adding 5 wt % NaCl on the wormhole shape and size. The coreflood experiments were run using 20 wt % GLDA at pH 3.8 at a flow rate of 2 cm$^3$/min, and 300° F. The initial core permeability was 3 md for the GLDA without NaCl, and it was 3.2 md for the GLDA with 5 wt % NaCl. Adding 5 wt % NaCl enhanced the reaction of GLDA with calcite through increasing its thermal stability. More wormholes were created with bigger diameter than that created without adding NaCl. The wormhole shape changed from circular to irregular spots after adding the salt to the GLDA solution. NaCl increased the thermal stability of GLDA, and at 300° F. the reaction rate was high, so the GLDA reacted with the rock more to create irregular shape wormholes. Others investigated the effect of adding sodium chloride to EDTA in the rotating disk experiments. They found that increasing the sodium chloride concentration from 0 to 0.7M (about 4.1 wt %), the reaction rate of EDTA with calcite was decreased by about 25%. The decrease in the reaction rate was attributed to the association of Na+ with EDTA and transport of Na-EDTA complexes.

We claim:

1. Process to create wormholes in a carbonate reservoir formation by contacting the carbonate reservoir formation with a solution having a pH less than 6, said solution comprising (i) a wormhole-forming agent, said wormhole forming agent consisting essentially of a chelating agent selected from the group consisting of glutamic acid N,N-diacetic acid (GLDA) and/or a salt thereof, methylglycine-N,N-diacetic acid (MGDA) and/or a salt thereof, or a combination thereof, and (ii) a salt other than a salt of either GLDA or MGDA, whereby at least one wormhole is created in said carbonate reservoir formation; wherein the solution is an aqueous solution of about 10 to about 30 wt. % of GLDA and/or a salt thereof, MGDA and/or a salt thereof, or a combination thereof.

2. Process of claim 1, wherein the salt other than a salt of either GLDA or MGDA comprises a chloride salt, a formate salt, a bromide salt, or a combination thereof.

3. Process of claim 1, wherein the pH of the solution is about 3 to about 5.

4. Process of claim 1, wherein the solution is injected into the carbonate reservoir at an injection rate of about 0.25 to about 5 barrels/min.

5. The process of claim 1 wherein said wormhole forming agent consists of said chelating agent.

6. The process of claim 1 wherein said chelating agent is selected from the group consisting of GLDA, salts of GLDA, and combinations thereof.

* * * * *